US012808599B2

(12) United States Patent
Hall et al.

(10) Patent No.: US 12,808,599 B2
(45) **Date of Patent: *Nov. 24, 2026**

(54) MULTIPLE LINKED APPLIANCE WITH AUXILIARY OUTLET

(71) Applicant: Intirion Corporation, Foxborough, MA (US)

(72) Inventors: Gregory Allan Thomas Hall, Guelph (CA); Philip Emma, Boston, MA (US); Jim Estill, Guelph (CA); Bryan Stuart Cunningham, Kitchener (CA); Dennis O'Brien, Guelph (CA)

(73) Assignee: INTIRION CORPORATION, Foxborough, MA (US)

( * ) Notice: Subject to any disclaimer, the term of this patent is extended or adjusted under 35 U.S.C. 154(b) by 628 days.

This patent is subject to a terminal disclaimer.

(21) Appl. No.: 18/142,118

(22) Filed: May 2, 2023

(65) Prior Publication Data

US 2023/0266055 A1 Aug. 24, 2023

Related U.S. Application Data

(63) Continuation of application No. 17/691,628, filed on Mar. 10, 2022, now Pat. No. 11,674,746, which is a (Continued)

(51) Int. Cl.
*F25D 23/12* (2006.01)
*F25D 29/00* (2006.01)
(Continued)

(52) U.S. Cl.
CPC ........... *F25D 23/12* (2013.01); *F25D 29/005* (2013.01); *H05B 6/666* (2013.01); *H05B 6/68* (2013.01)

(58) Field of Classification Search
CPC ...... H05B 6/642; H05B 6/6435; H05B 6/645; H05B 6/6458; H05B 6/6461;
(Continued)

(56) References Cited

U.S. PATENT DOCUMENTS 4,496,817 A 1/1985 Smith
4,587,393 A 5/1986 Ueda
(Continued)

OTHER PUBLICATIONS

*College Products, Inc.* v. *Intirion Corporation* PGR2024-00003 U.S. Pat. No. 11,674,745 Final Written Decision Entered Apr. 9, 2025.

(Continued)

*Primary Examiner* — Hung D Nguyen
(74) *Attorney, Agent, or Firm* — Ralph E. Jocke; Walker & Jocke

(57) ABSTRACT

A combination microwave and refrigerator system is provided. The microwave oven is connected to a source of power and has at least one control circuit for controlling the operation of the microwave oven. A first power supply outlet is provided on the microwave oven. A refrigerator is connected to the source of power by connection to the first power supply outlet. The control circuit is configured to disable the cooling operation of the refrigerator, when the microwave oven demands cooking power, and enable the cooling operation of the refrigerator when the microwave oven is not drawing cooking power. A sensor is provided in the microwave oven, and is configured to cause cooking power to the microwave oven to be turned off upon the sensor sensing a level of smoke.

43 Claims, 25 Drawing Sheets

Related U.S. Application Data continuation of application No. 16/671,383, filed on Nov. 1, 2019, now Pat. No. 11,274,876, which is a continuation-in-part of application No. 15/600,118, filed on May 19, 2017, now Pat. No. 10,495,374, and a continuation-in-part of application No. 15/239,378, filed on Aug. 17, 2016, now abandoned, said application No. 15/600,118 is a continuation of application No. 15/135,883, filed on Apr. 22, 2016, now Pat. No. 9,664,436, which is a continuation-in-part of application No. 14/262,290, filed on Apr. 25, 2014, now Pat. No. 9,657,974, which is a continuation-in-part of application No. 12/317,632, filed on Dec. 23, 2008, now Pat. No. 8,742,304.

(60) Provisional application No. 62/262,954, filed on Dec. 4, 2015, provisional application No. 62/211,765, filed on Aug. 29, 2015, provisional application No. 61/009,419, filed on Dec. 28, 2007.

(51) Int. Cl.
*H05B 6/66* (2006.01)
*H05B 6/68* (2006.01)

(58) Field of Classification Search
CPC ........ H05B 6/6482; H05B 6/66; H05B 6/666; H05B 6/68; H05B 6/80; H05B 6/806; H05B 6/808; F25D 23/003; F25D 23/12; F25D 29/005; F25D 31/005
USPC ....... 219/482, 483, 485, 488, 678, 679, 695, 219/697, 702, 715, 716, 717, 718, 719, 219/720, 721, 722, 723, 756, 757, 760, 219/761
See application file for complete search history.

(56) References Cited

U.S. PATENT DOCUMENTS

| | | | | |
|---|---|---|---|---|
| 5,521,359 | A * | 5/1996 | Bone | H05B 6/68 219/486 |
| 8,446,048 | B2 | 5/2013 | Butt | |
| 2009/0084778 | A1 * | 4/2009 | Smario | F25D 23/12 219/679 |
| 2010/0238639 | A1 | 9/2010 | Butt | |
| 2012/0276763 | A1 | 11/2012 | Quezada | |

OTHER PUBLICATIONS

*College Products, Inc.* v. *Intirion Corporation* PGR2024-00004 U.S. Pat. No. 11,674,746 Final Written Decision Entered Apr. 9, 2025.
*College Products, Inc.* v. *Intirion Corporation* PGR2024-00003 U.S. Pat. No. 11,674,745 Denial of Director Review of Final Written Decision Entered Jun. 20, 2025.
*College Products, Inc.* v. *Intirion Corporation* PGR2024-00004 U.S. Pat. No. 11,674,746 Denial of Director Review of Final Written Decision Entered Jun. 20, 2025.
*Intirion Corporation* v. *College Products, Inc.* Case No. 23-CV-4023 US District Court Northern District of Iowa Document 140 Order Filed May 31, 2024.
PGR 2024-00003 Decision Granting Post Grant Review Apr. 10, 2024.
PGR 2024-00004 Decision Granting Post Grant Review Apr. 10, 2024.
Petition For Inter Partes Review—Proceeding IPR 2023-01041 Jun. 8, 2023.
Petition For Inter Partes Review—Proceeding IPR 2023-01042 Jun. 8, 2023.
Petition For Inter Partes Review—Proceeding IPR 2023-01043 Jun. 8, 2023.
Lloyd, Cory; Hill, Aaron; Babineau, Matthew; Robinson, Matthew; Chin, Andrew "ISDU Integrated Smoke Detector Unit For Commercial Microwave Ovens" Northeastern University Undergraduate Capstone Project dated Apr. 17, 2007 (actual publication date of the non-patent document is not known—downloaded from the following website address in Sep. 2022, https://pdfs.semanticscholar.org/a8b1/685e9acb5d41f897799f2c10eabc6595662d.pdf First archived on Feb. 18, 2020 by the WayBack Machine at www.archive.org).
*Intirion Corporation* v. *College Products, Inc.* US District Court, ND Iowa Case No. 23-CV-4023-CJW-KEM Order (claim terms not indefinite p. 19) Entered Sep. 16, 2025.
PGR 2024-00004 PGR Petition U.S. Pat. No. 11,674,746.
PGR 2024-00004 Ex 1001 U.S. Pat. No. 11,674,746.
PGR 2024-00004 Ex 1002 Original Expert Declaration.
PGR 2024-00004 Ex 1003 File History 746.
PGR 2024-00004 Ex 1004 Intirion's Complaint.
PGR 2024-00004 Ex 1008 US20140251982A1.
PGR 2024-00004 Ex 1009 U.S. Pat. No. 11,274,876 claim 1 chart.
PGR 2024-00004 Ex 1011 Emma US20090188911A1.
PGR 2024-00004 Ex 1012 Northeastern University ISDU integrated smoke detector unit for commercial microwave ovens.
PGR 2024-00004 Ex 1014 Smith U.S. Pat. No. 4,496,817.
PGR 2024-00004 Ex 1015 Butt U.S. Pat. No. 8,446,048.
PGR 2024-00004 Ex 1016 290 App (PG20140251982) over Emma PG Pub (20090188911).
PGR 2024-00004 Ex 1020 US20120276763A1.
PGR 2024-00004 Ex 1021 Scheduling Order Iowa.
PGR 2024-00004 Ex 1022 Amended Complaint.
PGR 2024-00004 Ex 1023 Supplemental Expert Report.
*College Products, Inc.* v. *Intirion Corporation* PGR2024-00003 (U.S. Pat. No. 11,674,745) PGR2024-00004 (U.S. Pat. No. 11,674,746) Paper 27 Decision Denying Motion.
PGR2024-00003 PGR Petition U.S. Pat. No. 11,674,745.
PGR2024-00003 Ex 1001 U.S. Pat. No. 11,674,745.
PGR2024-0003 Ex 1002 Original Expert Declaration.
PGR2024-0003 Ex 1003 File History 745.
PGR 2024-00003 Ex 1004 Intirion's Complaint.
PGR 2024-00003 Ex 1008 US20140251982A1.
PGR 2024-00003 Ex 1009 U.S. Pat. No. 11,274,876 claim 1 chart.
PGR 2024-00003 Ex 1011 Emma US20090188911A1.
PGR 2024-00003 Ex 1012 Northeastern University ISDU integrated smoke detector unit for commercial microwave ovens.
PGR 2024-00003 Ex 1014 Smith U.S. Pat. No. 4,496,817.
PGR 2024-00003 Ex 1015 Butt U.S. Pat. No. 8,446,048.
PGR 2024-00003 Ex 1016 290 App (PG20140251982) over Emma PG Pub (20090188911).
PGR 2024-00003 Ex 1020 US20120276763A1.
PGR 2024-00003 Ex 1021 Scheduling Order Iowa.
PGR 2024-00003 Ex 1022 Amended Complaint.
PGR 2024-00003 Ex 1023 Supplemental Expert Report.
*College Products, Inc.* v. *Intirion Corporation* PGR2024-00003 U.S. Pat. No. 11,674,745 Petitioner's Notice of Appeal Entered Aug. 22, 2025.
*College Products, Inc.* v. *Intirion Corporation* PGR2024-00004 U.S. Pat. No. 11,674,746 Petitioner's Notice of Appeal Entered Aug. 22, 2025.

* cited by examiner

MULTIPLE LINKED APPLIANCE WITH AUXILIARY OUTLET

TECHNICAL FIELD

Exemplary embodiments relate to improvements to appliances. Specifically, exemplary embodiments relate to improvements to appliances that include compact refrigerator and microwave oven functionality.

BACKGROUND

Compact refrigerators are used for many different purposes. They are often found in dormitories, hotels, offices and other establishments. Compact refrigerators are also often used in housing units for storage of beverages in bar areas or entertainment areas. Compact refrigerators provide useful storage for refrigerated items without the requirement for the considerable floor space and power draw that is required for a full size refrigerator.

Compact refrigerators and associated appliances may benefit from improvements.

SUMMARY

In one exemplary arrangement, an appliance apparatus is provided that includes a microwave oven. The microwave oven includes a radiation emitting microwave element and a microwave housing. The microwave housing bounds a cooking interior area. The radiation emitting microwave element is operative to irradiate the cooking interior area. The apparatus also includes a refrigerator. The refrigerator includes refrigerator housing. The refrigerator housing bounds a cooled refrigerator interior area. The refrigerator housing is in fixed operative mechanical connection with the microwave housing. The refrigerator includes a refrigerant compressor, or other refrigeration technology. The refrigerant compressor is operative to compress a refrigerant material. The refrigerant material is operative to cause cooling of the cooled refrigerator interior area. The apparatus includes at least one power control circuit. The at least one power control circuit is operative to cause electrical power to be selectively delivered to the microwave element and the compressor. One of the microwave element and compressor does not operate when the other of the microwave element and the compressor operates. A charging pad is provided on the microwave oven. The charging pad is configured for receiving an item to be charged by the charging pad. The microwave oven further includes at least one smoke sensor. In exemplary arrangements different types of smoke sensors may be used. An exemplary sensor includes a sensor emitter and at least one sensor receiver configured to receive radiation from the at least one smoke sensor emitter, wherein air of at least a portion of the cooking interior area extends intermediate of the at least one sensor emitter and the at least one sensor receiver. The apparatus also includes at least one safety circuit. The at least one safety circuit is in operative connection with the at least one sensor emitter, the at least one sensor receiver, and the microwave element. The at least one safety circuit is operative to cause the at least one sensor emitter to emit sensor radiation and the at least one sensor receiver to sense sensor radiation from the at least one sensor emitter while the microwave element operates during a cooking session. A determination is made that a transmission amount of sensor radiation from the at least one sensor emitter that reaches the at least one sensor receiver has fallen by at least a threshold amount during the cooking session, due to smoke in the cooking interior area. Responsive at least in part to the determination, the microwave element is no longer supplied with electrical power.

Other features may be included in exemplary arrangements.

BRIEF DESCRIPTION OF THE DRAWINGS

The system of the application is explained in more detail below with reference to the accompanying drawings, in which.

DETAILED DESCRIPTION

Figure 1:
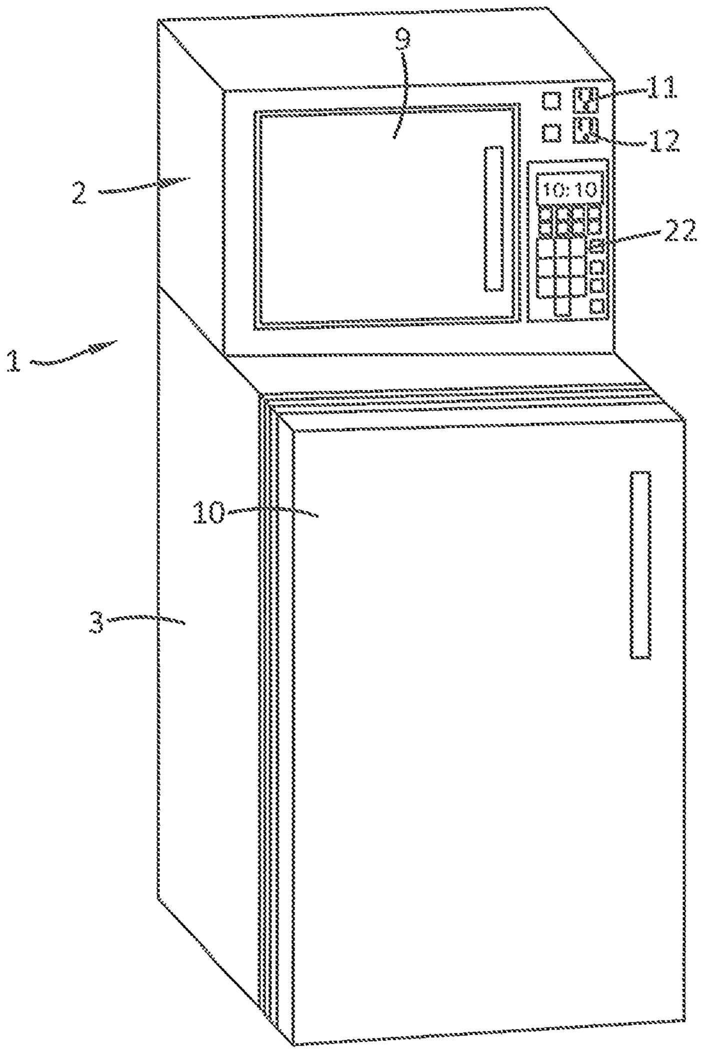
FIG. 1 is a front perspective view of an exemplary arrangement of an appliance system.

A multiple linked appliance system 1, for example, an appliance that comprises a combination microwave oven 2 and refrigerator 3 incorporating features described in the present application illustrated in the Figures. Although exemplary arrangements will be described with reference to the features shown in the drawings, it should be understood that other arrangements may have many alternate forms. In addition, any suitable size, shape or type of elements or materials could be used. The computer or controller devices described in this application may be constructed having one or several processors and one or several program product modules stored in one or several memory elements. For illustration, computer or controller components may be described as individual units by function. It should be understood, that in some instances, these functional components may be separated or combined in other components.

In the exemplary arrangements, the circuits described herein may comprise one or more circuits including processors which for purposes hereof corresponds to any electronic device that is configured via circuit executable instructions that can be implemented in either hardware circuits, software, firmware or applications that are operative to enable the circuits to process data and carry out the other actions described herein. For example, the circuits may include circuits that correspond to one or more or a combination of a CPU, FPGA, ASIC or any other integrated circuit or other type or circuit that is capable of processing data. The processors may be included in a computer, server or other type of electronic device. Further, the circuits described herein may include data stores that correspond to one or more of volatile or non-volatile memories such as random access memory, flash memory, magnetic memory, optical memory, solid state memory or other devices that are operative to store computer executable instructions and data. Computer executable instructions may include instructions in any of a plurality of programming languages and formats including, without limitation, routines, subroutines, programs, threads of execution, objects, methodologies and functions which carry out the actions such as those described herein. Structures for the circuits and processors may include, correspond to and utilize the principles described in the textbook entitled Microprocessor Architecture, Programming, and Applications with the 8085 by Ramesh S. Gaonker (Prentice Hall, 2002), which is incorporated herein by reference in its entirety. Of course it should be understood that these circuit structures are exemplary and in other embodiments, other circuit structures for storing, processing, resolving and outputting information may be used.

In exemplary arrangements the refrigerator may be connected to a power supply that provides a connection that enables the microwave oven to be connected to the same electrical supply. A single plug, therefore, may serve to connect both appliances and the current required for each appliance may be supplied by the same supply power cord and circuit. In exemplary embodiments power may be supplied by the 110V AC current outlet.

To make this combination attractive for use in dorm rooms, hotel rooms, recreational vehicles, tractor trailer cabs, and other similar locations, it may be necessary to assure that the peak current draws of both appliances are not demanded from the supply at the same time. Many household circuits are protected from overload conditions by an automatic circuit breaker that is activated when current in the circuit exceeds the breaker rating. This is 15 amps in many circuits.

The duty cycle of an exemplary refrigerator used in these combined appliance systems includes a current spike that occurs during the first few seconds of operation. This is the start up current for the refrigerator compressor. The current draw is considerably reduced as the compressor attains its full operational speed. In typical refrigerator appliances the peak current may be in the range of 7 to 9 amps, while the steady state current may level off at 1.4 amps or less. A microwave oven demands a relatively steady 8 to 13 amps of cooking power during operation of the cooking element. It is apparent that an overload condition may occur when both appliances are placed in operation absent suitable control circuitry.

In an exemplary arrangement, a combination microwave and refrigerator appliance system is constructed having a single electrical plug input supply. The electrical supply in the exemplary arrangement is directly connected to the microwave oven. The microwave oven is adapted to provide power to the refrigerator through a power supply outlet, and to auxiliary receptacles adapted for connection to devices that operate at a low power operation draw. The microwave oven includes at least one control circuit including a processor based controller adapted to monitor operation of the refrigerator compressor and control the power to the microwave magnetron cooking element and other components. The current draws on the low power receptacles are separately monitored for control by the microwave controller. The microwave controller is adapted to balance the duty cycles of the connected appliances in operative connection therewith to avoid overload conditions. A control logic flow is implemented internally within the circuitry of the microwave controller. A receptacle or other power connecting power supply outlet for the refrigerator and the low power auxiliary receptacle may be implemented as part of the microwave control panel on the microwave oven.

In one arrangement, the auxiliary outlets are constructed to provide low power for the purpose of recharging batteries included in cellular mobile phones, personal media devices and digital cameras, in addition to operating lap top computers and other similar low power devices. The current to the auxiliary outlets is sensed by suitable circuitry in operative connection with the microwave controller.

In another exemplary arrangement, the power to the auxiliary outlets is disabled through operation of the microwave controller when the microwave magnetron is energized or whenever the current to the auxiliary outlets exceeds a preset value.

In one exemplary arrangement, a programmed control model for control logic flow is established and executed by the microwave controller. The model is dependent on the state of operation of the microwave cooking element or elements which are referred to herein as a magnetron. As part of the exemplary control model, the power draw of the compressor is monitored to sense operation of the compressor to compress refrigerant to provide cooling. When cooking power is demanded by the microwave the compressor is disabled by having electrical power thereto withdrawn by the at least one control circuit for a preset minimum period. When power demand to the magnetron ceases, refrigerator compressor power is restored provided that the preset minimum period has expired.

In another exemplary arrangement of the control model, sensing circuits are operative to monitor current draw on the auxiliary outlets. The control model is adapted to cause the controller to disable the power to the auxiliary receptacles, if the microwave magnetron is in operation. In addition the auxiliary receptacles are disabled if a predetermined maximum current draw is sensed. Another control model is based on operation of the refrigerator and operates to disable the auxiliary receptacles when the compressor is in the start up mode. Of course these approaches are exemplary and in other arrangements, other approaches may be used. Further while in the exemplary arrangement the at least one control circuit which is included in the controller is integrated with the microwave oven, in other arrangements the controller may be integrated with the refrigerator or other device, or may be configured as a separate component.

In one aspect of an exemplary arrangement, a non-transitory processor readable medium having processor executable program instructions embodied therein for operating at least one processor of a control circuit to control an appliance system of multiple linked components including a microwave oven, a refrigerator, and an auxiliary power supply outlet is provided. The processor executable program code causes the control circuit to disable the refrigerator and the auxiliary power supply outlet, when the microwave demands high power such as magnetron cooking power, and enable power delivery from the auxiliary power supply outlet when the microwave is not drawing cooking power.

Figure 2:
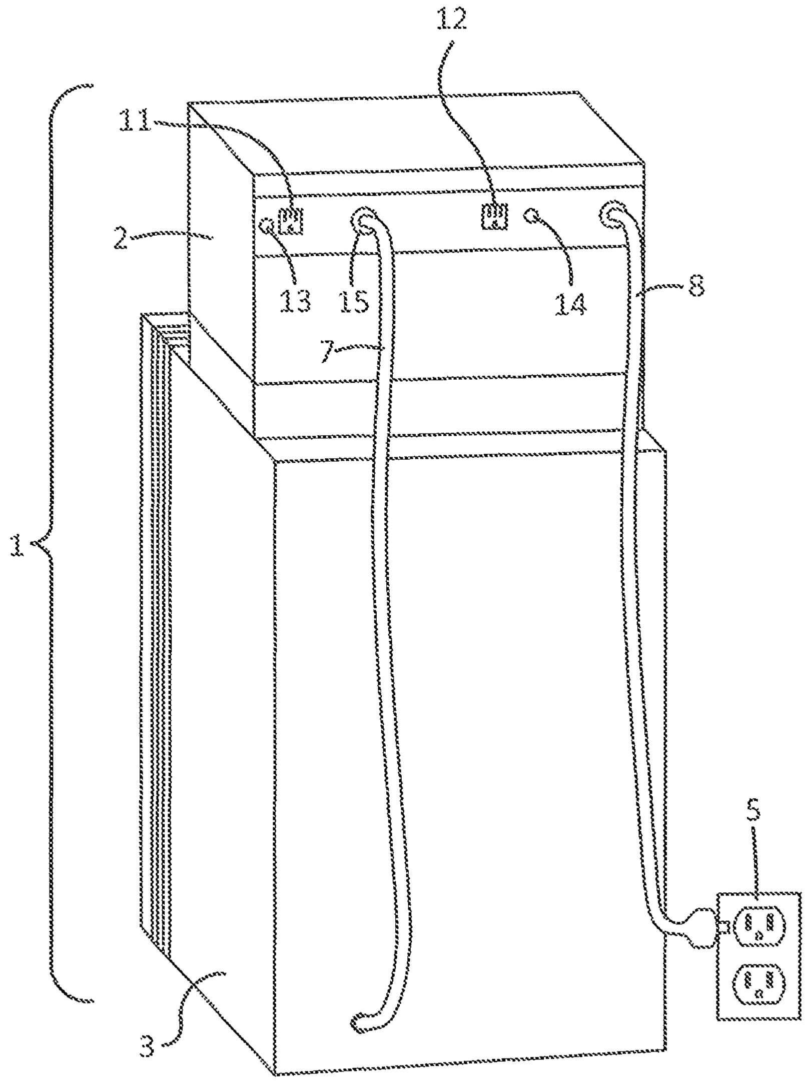
FIG. 2 is a rear perspective view of the arrangement of FIG. 1 showing an alternative arrangement.

One exemplary arrangement of a multi-component inter-connected appliance system 1 is illustrated in FIG. 1. This arrangement consists of two components, a refrigerator 3 and a microwave oven 2. Refrigerator 3 is electrically connected to microwave oven 2 by power cord 7 to refrigerator receptacle 15, shown at the rear of the microwave 2 in FIG. 2. Refrigerator 3 is generally subject to control by the microwave microprocessor controller which is alternatively referred to herein as a power control circuit 4 of the microwave oven 2. The power control circuit may be operative to cause electrical power to be selectively delivered to and/or withheld from the microwave magnetron and the refrigerator compressor. A single power cord 8 provides input electrical power to the system 1 from receptacle 5 which provides a source of electrical power, through microwave 2. In the case where stand alone components are used, as shown in FIGS. 1 and 2, microwave oven 2 is connected directly to power source 5. The refrigerator 3, as the heaviest component, is used as the base with the microwave oven 2 stacked on top. In the selection of the refrigerator 3, it would be advantageous in some arrangements for the height of the refrigerator to be no more than 48 inches above the floor. This provides a more ergonomic operation of the microwave oven 2 for the user. In addition, in the stacked position of the components in an exemplary arrangement, the doors 9 and 10 of the microwave 2 and refrigerator 3, respectively, are arranged in a common plane.

Figure 3:
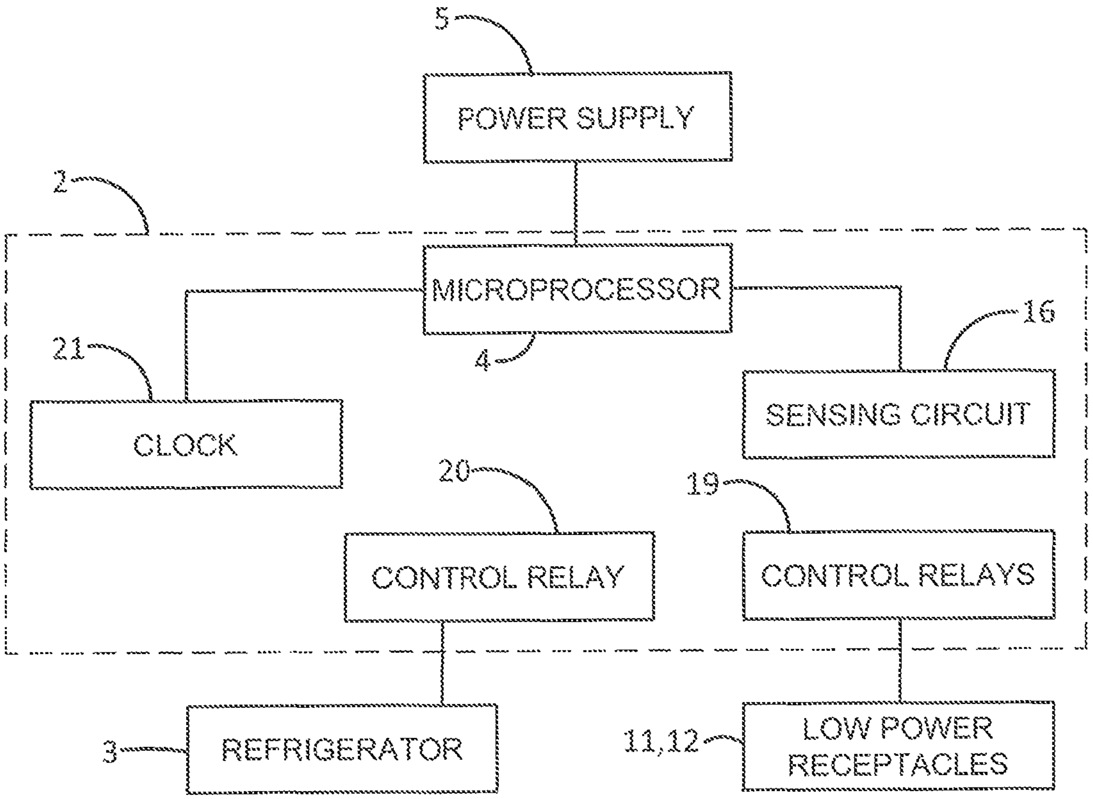
FIG. 3 is a schematic block diagram of an arrangement of the exemplary system.
Figure 8:
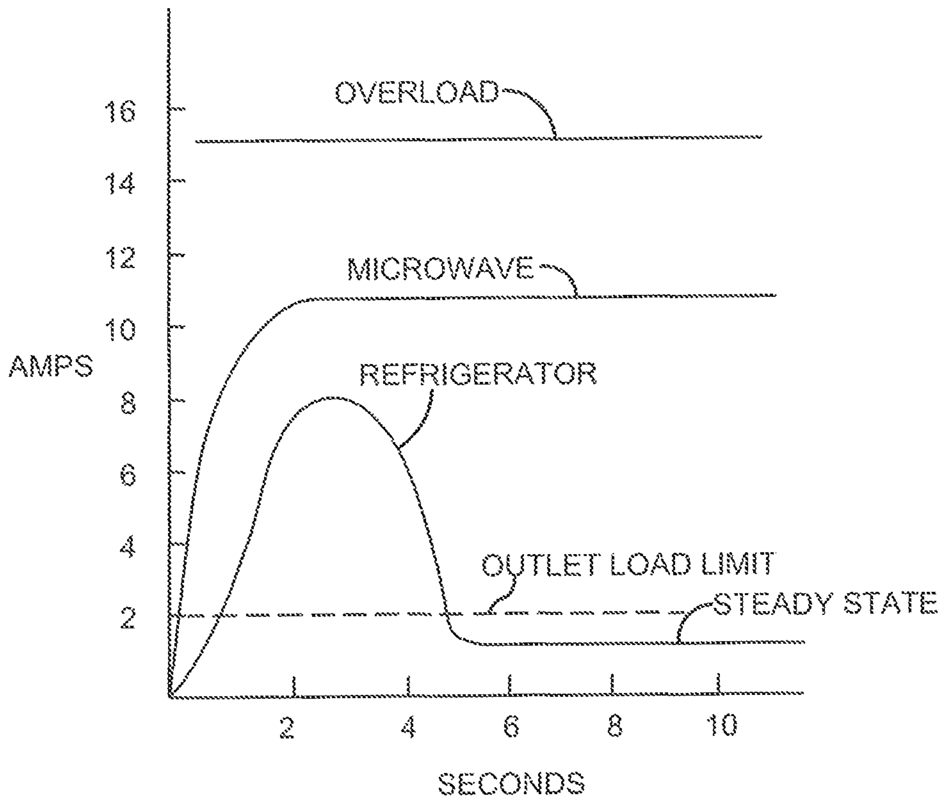
FIG. 8 is a graph illustrating the duty cycles of the components of the appliance in the system of FIG. 3.

At least one power control circuit 4 serves as a controller for the operation of the microwave oven 2 and is also adapted to control the other components of system 1, as shown in FIG. 3. Power is distributed throughout the system 1 under control of microwave controller 4 and digitally operated switches such as relays 19 and 20 represented in FIG. 3. It should be understood that in some arrangements the relays may control power delivery via mechanical contacts while in other embodiments, solid state relays may be used. Power is distributed to each of the appliance components 2 and 3, and to auxiliary low power receptacles 11 and 12. In use lamps 13 and 14 in the form of LEDs or the like may be positioned adjacent to the auxiliary receptacles to indicate power being available from the adjacent receptacle or power to the receptacle being disabled. The low power auxiliary receptacles 11 and 12 are provided to permit convenient access for plugging in a low power device, for example, devices including rechargeable batteries, such as cellular phones, PDAs, or other electronic devices that do not demand high power. As shown in the graph of FIG. 8, there are instances during which, if more than one of the appliances is in use, the cumulative current would cause an overload condition.

An exemplary control panel 22 of microwave oven 2 may be adapted to provide a display of the particular status of the controlling relays. For example, LEDs 13 and 14 may indicate that power to the outlets 11 and 12 are disabled or available. In one exemplary arrangement the lamps will light when power is available at the outlet and flash when disabled. In another exemplary arrangement the lamps will light when power is not available at the outlet and not activate when power is available at the outlet as a means to reduce the standby power draw. A button operated touch panel is used in the exemplary arrangement to provide manual control.

Figure 4:
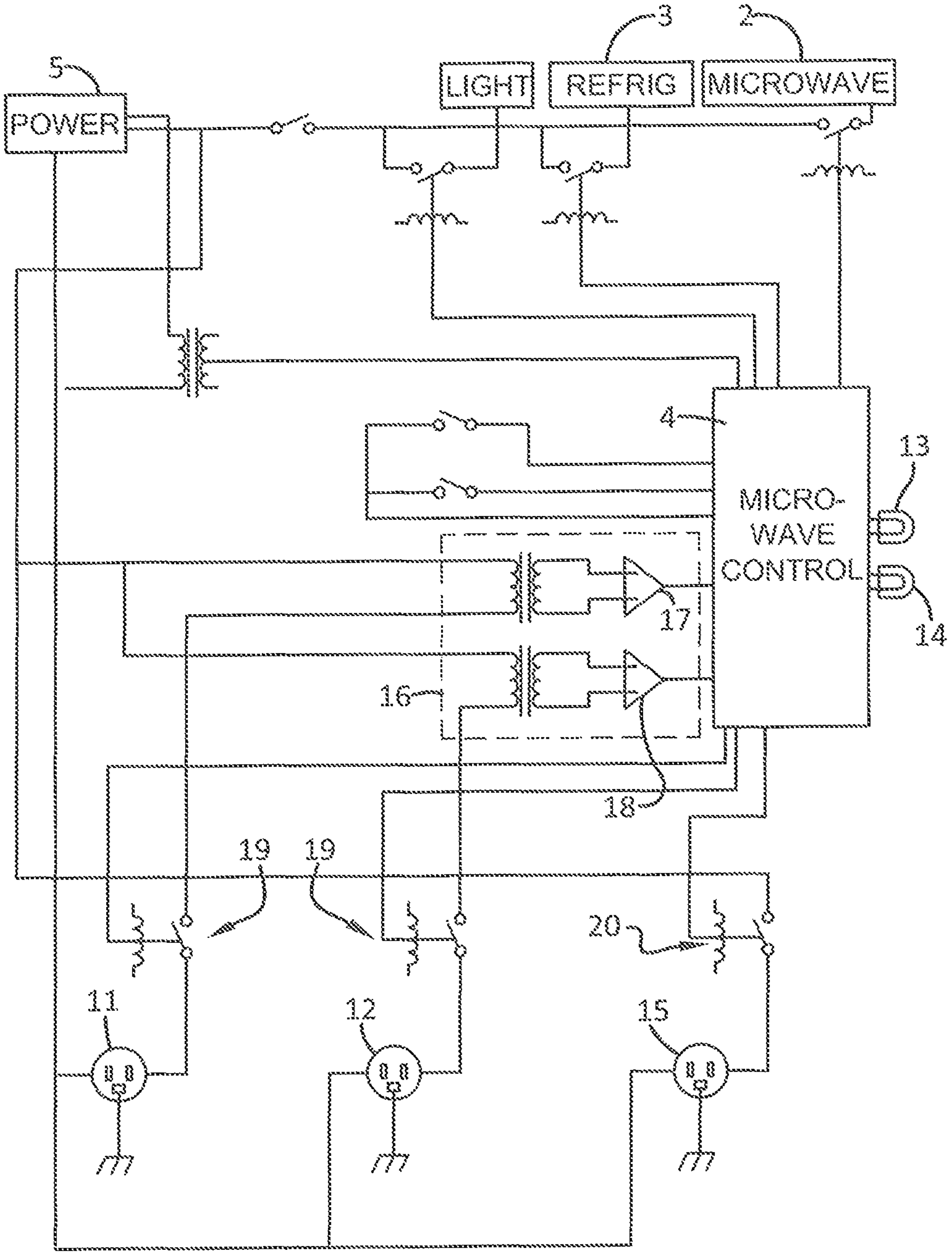
FIG. 4 is an electrical schematic diagram corresponding to the arrangement of FIG. 3.

As shown in FIG. 4, in order to control the power to the microwave 2, refrigerator 3 and receptacles 11 and 12, sensing circuits, may be coupled to the at least one control circuit to monitor current draw by the appliance components and the auxiliary receptacles. A relay 20 is connected in the power line to the refrigerator and may be actuated by signals from controller 4. In particular, according to an exemplary arrangement, sensing circuits 16, as shown in FIG. 4, have sensors 17 and 18 coupled to the power line of the auxiliary outlets 11 and 12 to monitor the current being drawn by a connected device. Sensors 17 and 18 may include current sensing transformers of the type available from Triad Magnetics of Corona, Calif. The signals generated by sensors 17 and 18 may be used to activate switches or other control components, such as relays 19. Relays 19 may be actuated by the at least one control circuit 4 to enable and disable the delivery of power to the low power auxiliary outlets 11 and 12 in response to signals from sensors 17 and 18. A maximum current may be set through the program logic associated with the at least one power control circuit 4 to prevent overload of the outlets 11 and 12. In one arrangement of the system, the maximum current limit is set at 2 amps, and the control circuitry is operated to cease power delivery in situations where the power draw exceeds this amount. Of course this approach is exemplary.

In another exemplary arrangement, a clock function 21 included in the at least one power control circuit 4 is used to provide timed delays during which, for example, refrigerator 3 would be prevented from undesirably rapid on/off cycles. When the compressor of the refrigerator 3 is disabled during microwave cooking operation, a time delay of 3 minutes is provided during which the compressor of the refrigerator 3 will remain disabled, even if microwave use is only for a short period. Control circuit 4 may be programmed to manage the power delivery to the components of the appliance to avoid overload conditions, while minimizing disruptions in the use of an individual appliance component. A model of operative events and related control operations may be designed into the program instructions executed by at least one control circuit 4 to provide a control methodology as illustrated in FIGS. 5-7.

In one exemplary arrangement, as illustrated in the block diagram of FIG. 3, at least one control circuit 4, constructed as part of the controller for microwave 2, is adapted to receive and process the sensor signals and identify particular events in the system 1 related to a particular appliance component or combination of appliance component conditions. Circuit 4 controls the power to microwave 2 and refrigerator 3 and also low power receptacles 11 and 12 to avoid overload conditions. The circuit 4 is operative to execute the control methods illustrated and described below. In one exemplary arrangement, the circuit 4 is operative to control operations of microwave oven 2 and is adapted to execute the program instructions described below. The at least one control circuit is coupled directly to refrigerator outlet 15 and low power outlets 11 and 12.

In one exemplary arrangement, shown in FIG. 1, the outlets 11, and 12, are included as part of the front control panel of microwave oven 2. In FIG. 2, in another arrangement, the auxiliary receptacles 11 and 12 and refrigerator receptacle 15 are accessible at the rear of the microwave oven 2. In these alternative arrangements, the microwave oven 2 is connected by supply cord 8 directly to power supply receptacle 5. Refrigerator 3 is connected by power cord 7 to receptacle 15 on microwave oven 2 as shown in FIG. 2.

Figure 5:
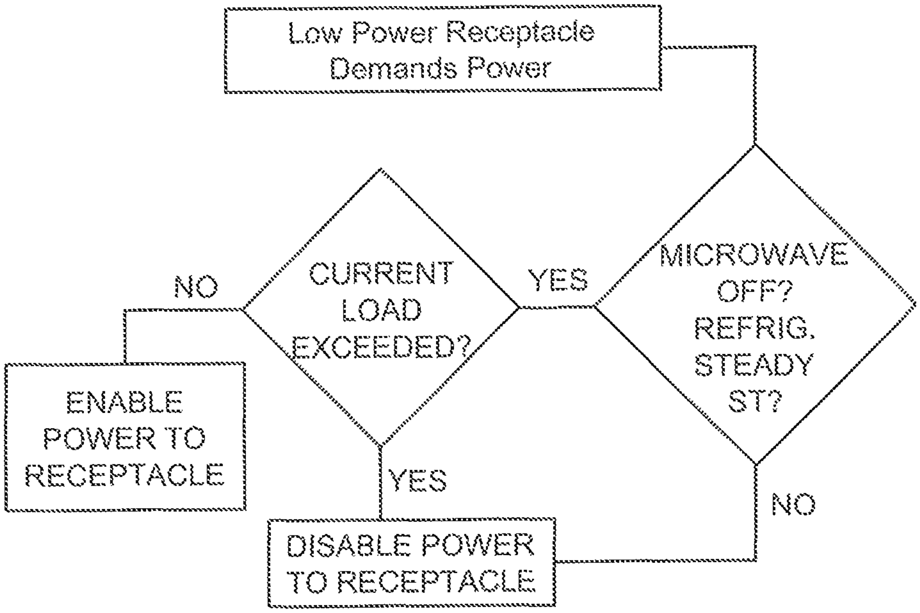
FIG. 5 is a schematic logic flow diagram of an exemplary arrangement.
Figure 6:
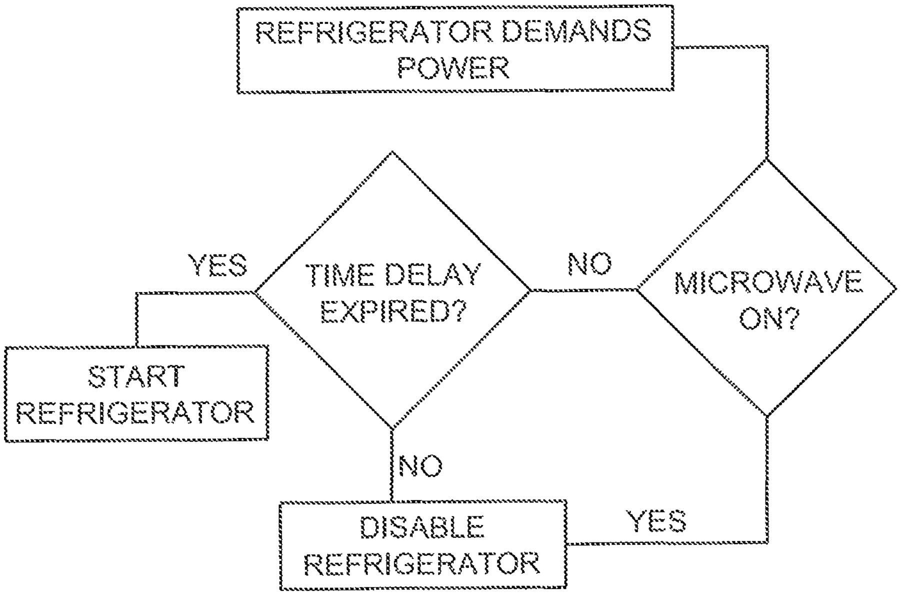
FIG. 6 is a schematic logic flow diagram of another exemplary arrangement.
Figure 7:
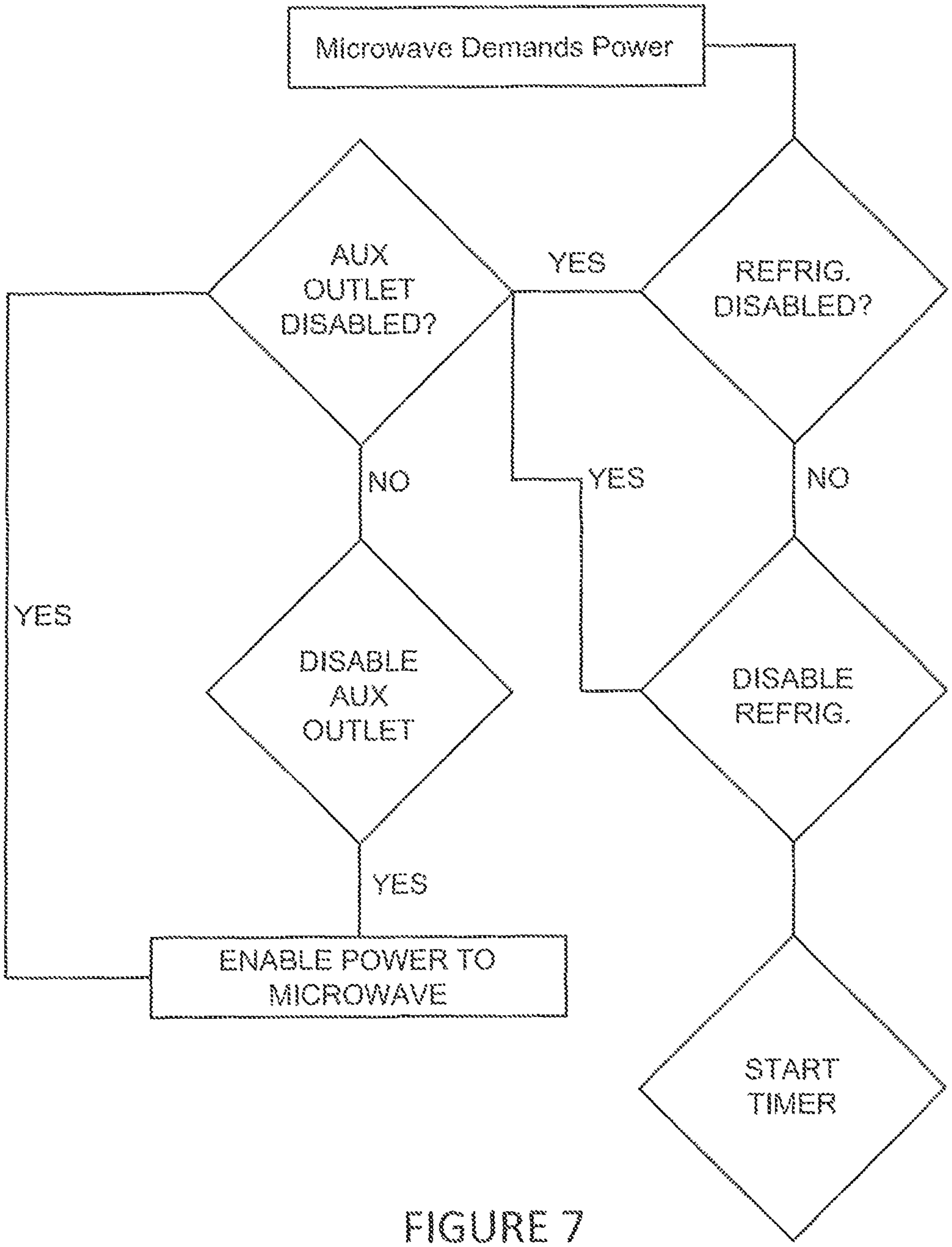
FIG. 7 is a schematic logic flow diagram of another arrangement.

In one exemplary arrangement, control models for program logic flows are established as shown in FIGS. 5-7 for execution by the at least one control circuit 4. These models can be in the form of processor executable instructions stored in a computer readable medium, such as software or firmware associated with the circuit 4. The models shown are, in the first instance, dependent on the state of operation of microwave oven 2. The current demands of the microwave 2 when drawing cooking power are generally the most significant contribution to overload, as shown in FIG. 8. To avoid overload conditions, power to the low power receptacles 11 and 12 and refrigerator receptacle 15 is disabled during microwave magnetron operation. If the refrigerator 3 compressor is drawing power when the microwave 2 is turned on to commence cooking, the power to the refrigerator compressor is turned off and clock function 21 is used to determine a predetermined period during which the compressor of refrigerator 3 cannot be restarted. A time delay, for example, of 3 minutes, may be set through programming of the at least one control circuit and when this delay period has expired, receptacle 15 may again be enabled, providing the control circuit determines in accordance with its programming and sensed parameters that microwave cooking operation has ceased. This prevents a too rapid restart of the compressor that may otherwise result in damage.

In some exemplary arrangements, the at least one control circuit of the power controller may operate responsive to sensing the power draw of the refrigerator and the cooking element of the microwave oven so as to detect the power draw reaching a threshold which should not be exceeded to prevent an overload condition. In other exemplary arrangements, the control circuitry may operate to detect inputs that may be provided by input devices and which are operative to cause power drawing components of devices such as the magnetron of the microwave oven or the compressor of the refrigerator to operate. In such arrangements, the control circuitry may operate to detect the signal from a thermostat within the refrigerator which indicates that the thermostat is signaling that the refrigerant compressor should operate to cause the temperature to be lowered within the cooling area of the refrigerator. In such arrangements, the at least one control circuit may operate to detect the signal from the thermostat and prevent the delivery of power to the compressor in situations where the cooking element of the microwave oven is operating. In such arrangements the control circuitry may delay the supply of power to the compressor until the cooking element of the microwave oven has ceased operation. Likewise in an exemplary arrangement the at least one control circuit may be operative to detect inputs to at least one input device of the control panel of the microwave which are provided by a user to commence microwave operation. In response to the detection of such inputs, the exemplary control circuitry may be operative to first cause a determination to be made as to whether the refrigerator is drawing the level of power that indicates that the compressor thereof is operating. In response to a determination that the refrigerator is drawing a level of power that is incompatible with operation of the microwave cooking element, the exemplary control circuitry may be operative to cause power to the refrigerator compressor to be withdrawn. Thereafter the at least one control circuit may be operative to cause power to be supplied to the cooking element of the microwave. Further in exemplary arrangements, the at least one control circuit may also monitor the power draw of auxiliary outlets or other power delivery points to assure that the level of draw that is currently occurring will not be an impediment to an operation that is being requested by an input device of the apparatus before the apparatus begins to operate in a manner that will cause increased power draw. Thus the exemplary appliance apparatus enables the preventative action of discontinuing operation of a power drawing component before instituting operation of another component that draws a high level of power. Of course it should be understood that this approach is exemplary and in other arrangements, other approaches may be used.

In the arrangement shown in FIG. 5, if low power is demanded at receptacle 11 or 12 and microwave oven 2 is not in use for cooking, power is supplied to the low power receptacles, provided further, that the current demand at an individual outlet does not exceed a preset limit, for example, 2 amps. Since the auxiliary outlets may be enabled during refrigerator compressor operation, there may be an overload generated at peak compressor operation. In one arrangement the at least one control circuit acts to disable the auxiliary outlets during compressor startup to prevent accidental overload of the system. Therefore as illustrated in the logic flow diagram of FIG. 5, control circuitry may be adapted to check the operational status of the refrigerator, as well as the microwave oven, prior to enabling the auxiliary outlets.

Figure 9:
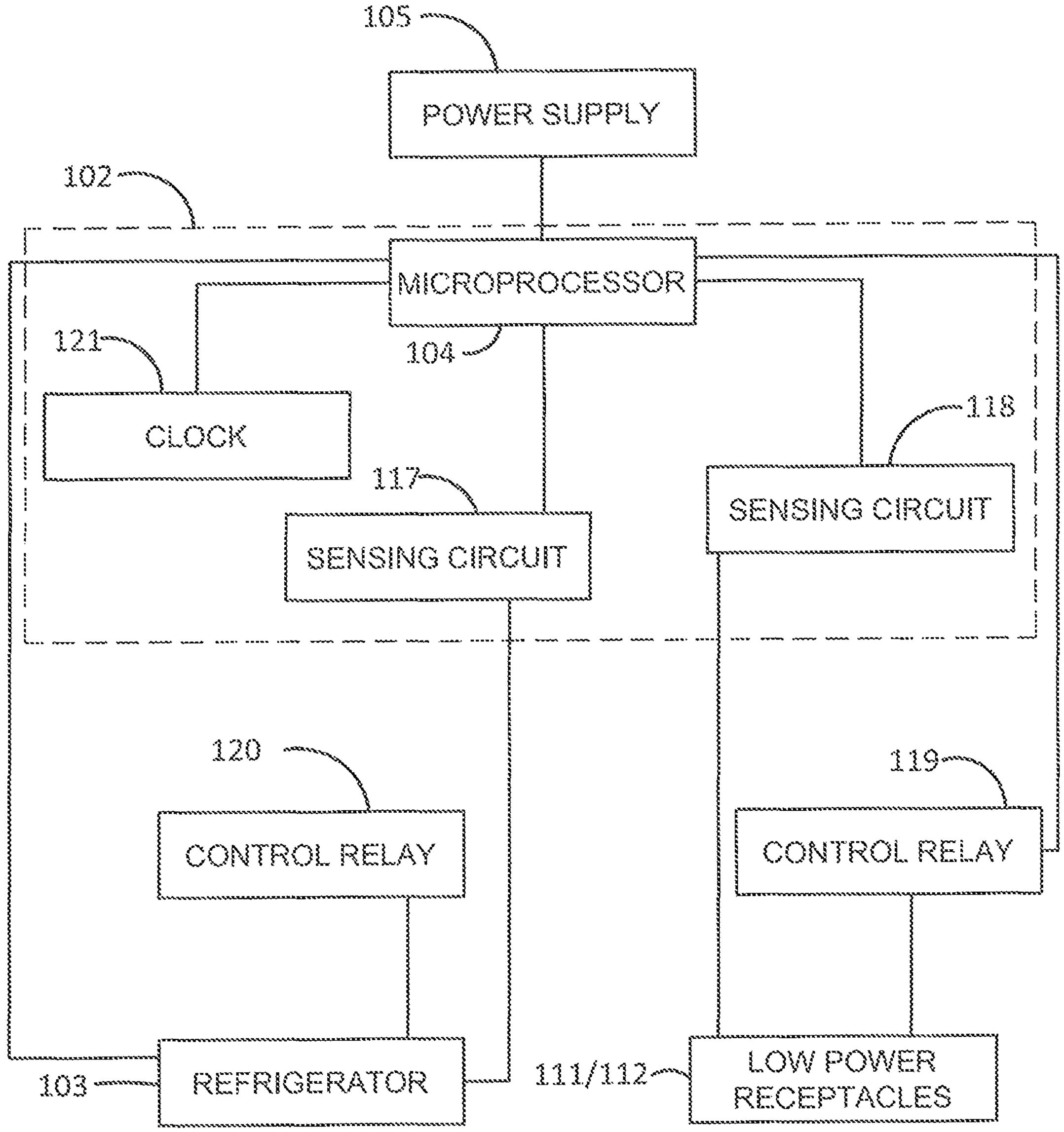
FIG. 9 is a block diagram of an alternate arrangement.
Figure 10:
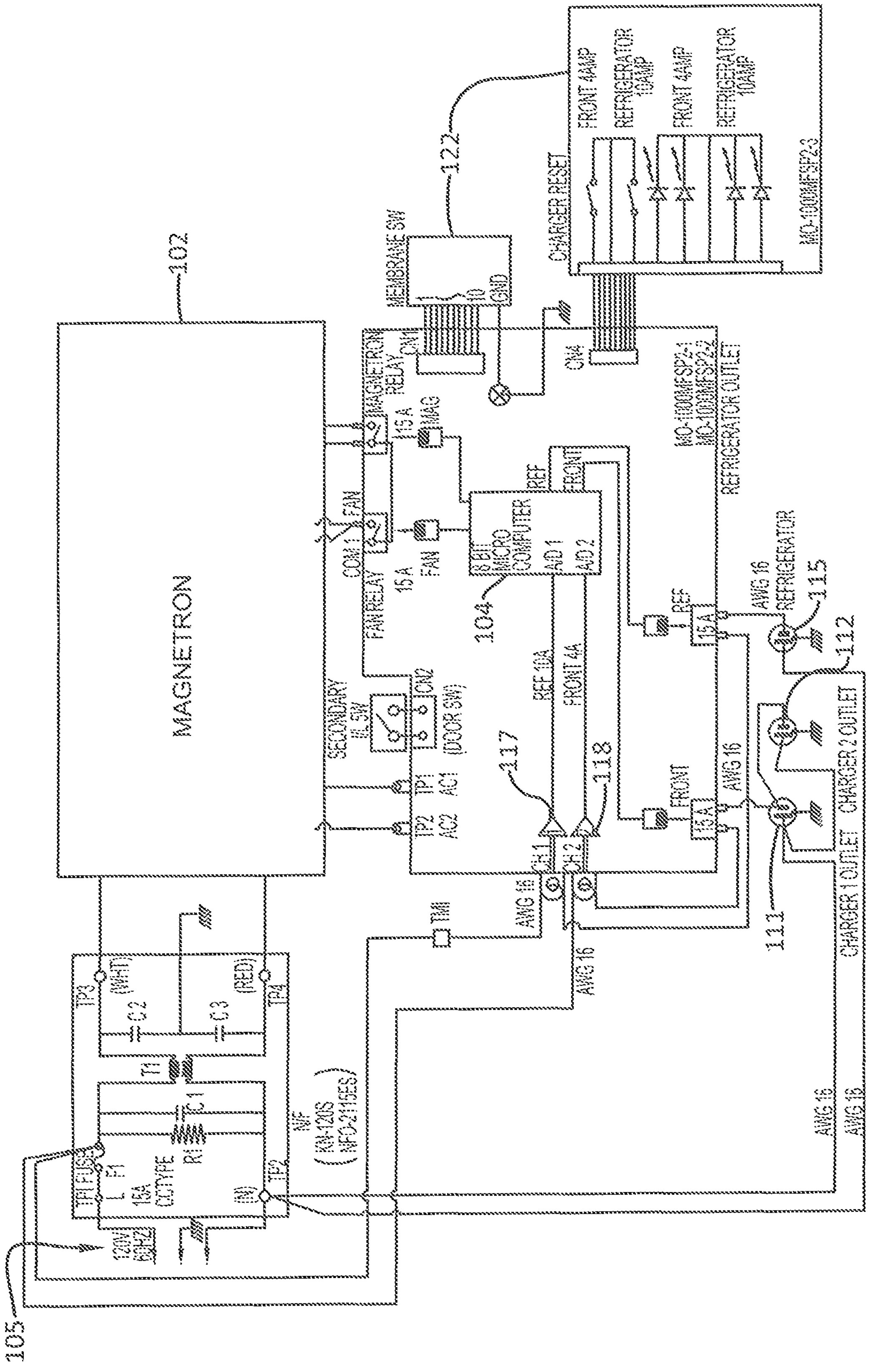
FIG. 10 is an electrical schematic diagram of the arrangement of FIG. 9.
Figure 11:
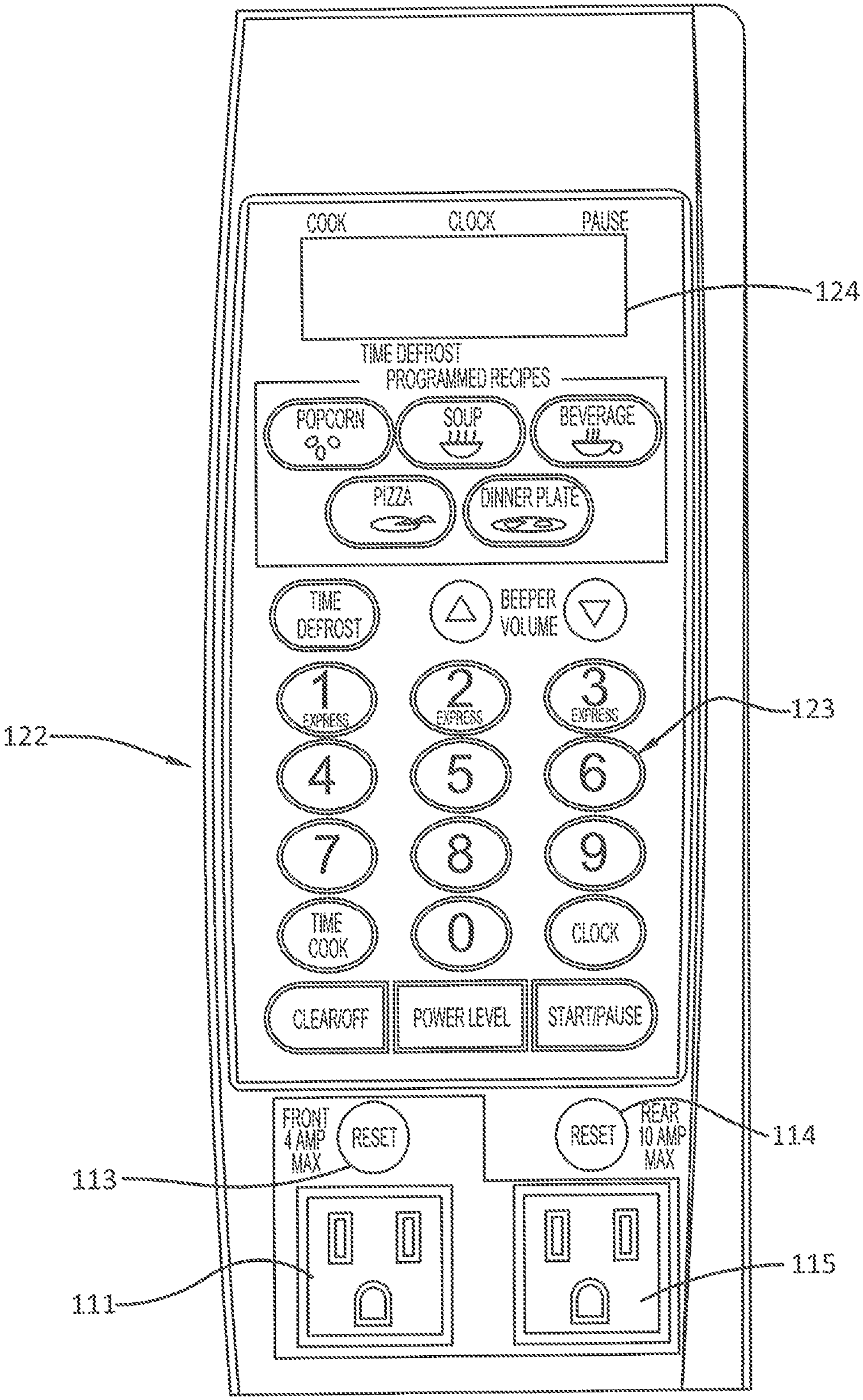
FIG. 11 is an illustration of a control panel of the arrangement of FIG. 9.

FIGS. 9-11 illustrate another exemplary arrangement. In this arrangement the sensing components 117 and 118 are configured to reduce the risk of overload by the combined demands of the auxiliary outlets 111 and 112 and the refrigerator outlet 115. In the exemplary configuration as shown in FIG. 10, current sensor 117 is configured to monitor the current draw through the refrigerator outlet 115 and the circuitry is operative to limit the refrigerator current draw at the outlet 115 so that it does not exceed 10 amps. Current sensor 118 is connected to monitor the combined current in the auxiliary outlets 111 and 112. Current sensor 118 and the control circuitry is configured to limit the combined auxiliary outlet current draw to 4 amps. In this manner the risk of overload is minimized. As represented in the block diagram of FIG. 9, the microwave 102 has at least one control circuit comprising controller 104 that is operatively connected to power supply 105. Clock function 121 which is shown schematically separately but may be part of the controller provides a timing device to determine a restart delay for power to refrigerator 103. Sensing circuit/sensor 117 is configured to monitor the current demanded by refrigerator 103 and sensing circuit/sensor 118 is connected to low power receptacles 111 and 112 is operative to monitor the combined current draw on receptacles 111 and 112. In the exemplary arrangement the control circuitry is shown as operative to control the availability of electrical power to some devices as a whole. For example, if the at least one control circuit operates to cause power not to be available to the refrigerator, all components of the refrigerator, such as the internal lights, air circulation fan, etc., are not supplied with electrical power, in addition to the compressor, which is the component which is most likely to draw power at a level which may be excessive. However in other arrangements, the at least one control circuit may be configured to deliver and withhold power selectively to individual refrigerator components or groups of such components. Thus in such arrangements the power control circuitry may be operative to withdraw power to the high power draw component(s) such as the compressor, while still making power available to other low power draw components such as the internal fan and/or lights.

Likewise in exemplary arrangements, the power control circuitry is operative to selectively allow power to be available or withdrawn from components of the microwave oven. For example, exemplary arrangements control the availability of power to selected components of the microwave oven such as the magnetron and the auxiliary outlets. The at least one power control circuit of exemplary arrangements may operate to maintain electrical operation of certain components, even though electrical power to other components is not available. For example, an exemplary controller may operate to maintain power to the clock display output on the control panel at all times. Further some exemplary arrangements may assure that power is maintained to control circuitry with programmed settings so that programmed data is not lost. This may include for example programmed data concerning a future time to turn on the cooking function, the power level and/or how long to cook. This way if the memory of the microwave has been programmed to begin to cook a food item placed inside the microwave oven at a future time so it is cooked by the time a person returns (for example) the programmed instructions to carry out those instructions will not be lost. Alternatively, configuration data that enables the microwave oven controller to communicate in a wireless network or with other devices will be preserved even though the control circuitry operates to cause electrical power not to be available to certain components. Of course these are merely examples.

It should be understood that for purposes hereof when it is stated that power is withdrawn or not made available to a microwave oven, refrigerator or other assembly of components, the terminology refers to not making such power available to the entire assembly or to only certain selected components that draw high power such as the refrigerant compressor or magnetron. Likewise herein references to the microwave or the refrigerator operating or running refers to operation of the respective high power draw components such as the magnetron or the compressor, for example.

In an exemplary arrangement, as shown in FIG. 11, a control panel 122 is arranged with at least one input device in the form of a keypad 123 for manual control and a display 124. Auxiliary outlet 111 is shown as accessible from the front and is associated with a status LED indicator and reset button 113 that may be caused to be operative during use and switch to a flashing mode when the microwave is drawing cooking power. Refrigerator outlet 115 is also accessible on the exemplary front panel and is associated with an LED indicator and reset button 114. Similarly LED indicator 114 is controlled to be on by being illuminated during use of the refrigerator and to switch to a flashing mode when the microwave is drawing cooking power. In another exemplary arrangement, the status LED indicator and reset button 113 may be caused to be off during use and switched on or to a flashing mode when the microwave magnetron is drawing cooking power. Similarly, in this arrangement, the LED indicator 114 is controlled to be off during operation of the refrigerator compressor and switched on or to a flashing mode when the microwave radiation cooking element is operating.

A further exemplary arrangement of the logic flow operational model is shown in FIG. 6. In this model, the refrigerator compressor draws or demands power. This may be triggered by a temperature rise of the refrigerator interior area within the housing of the refrigerator and involve start up of the refrigerator compressor with an associated peak power demand. If the microwave cooking element is sensed by the control circuitry as currently drawing cooking power, the programming of the control circuitry causes power not to be available the refrigerator so that operation of the refrigerator compressor will be delayed. If the microwave cooking element was on and subsequently cycled off, the clock function 21 must be checked by the controller to determine if power availability to the refrigerator to restart can occur. Under some circumstances, it may be necessary to give the refrigerator compressor priority to prevent an undesirable rise in temperature. In the latter instance, the at least one control circuit can be coupled to the refrigerator temperature sensor to execute a programmed sequence during which the microwave cooking element will be disabled by not having power supplied thereto to allow the refrigerator to operate long enough to return to proper operating temperatures.

In the exemplary arrangement of FIG. 7, the exemplary control circuitry operates to give priority to the power demands of the microwave oven, as indicated above. Use of the receptacles 11, 12, and 15 are, therefore, caused to be disabled during microwave cooking operation. The operational models which carry out the logic represented in FIGS. 5-7, may be established by logic flows implemented by instructions that are programmed or imbedded in the control circuitry of controller 4.

In this manner an appliance system of linked components, including a microwave oven, refrigerator, and at least one low power draw device or appliance may all be connected through a common supply cord to a releasably connectable receptacle providing a source of house current or other electrical power level without the risk of inconvenient interruptions or damage during use caused by overloads.

It is also advantageous to provide such a combination microwave/refrigerator system that also provides auxiliary outlets for low power applications, such as for the purpose of recharging batteries in cellular phones, operating lap top computers and other low power devices, while controlling the operation of the appliance to avoid overload conditions.

Figure 13:
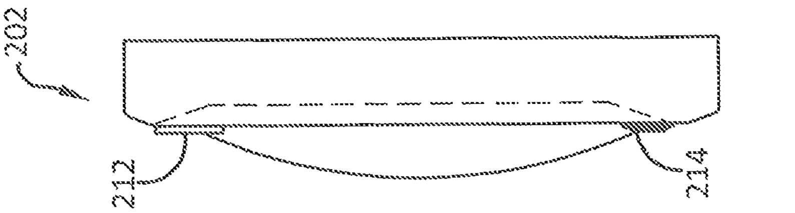
FIG. 13 is a side view of the microwave oven door of FIG. 12.
Figure 12:
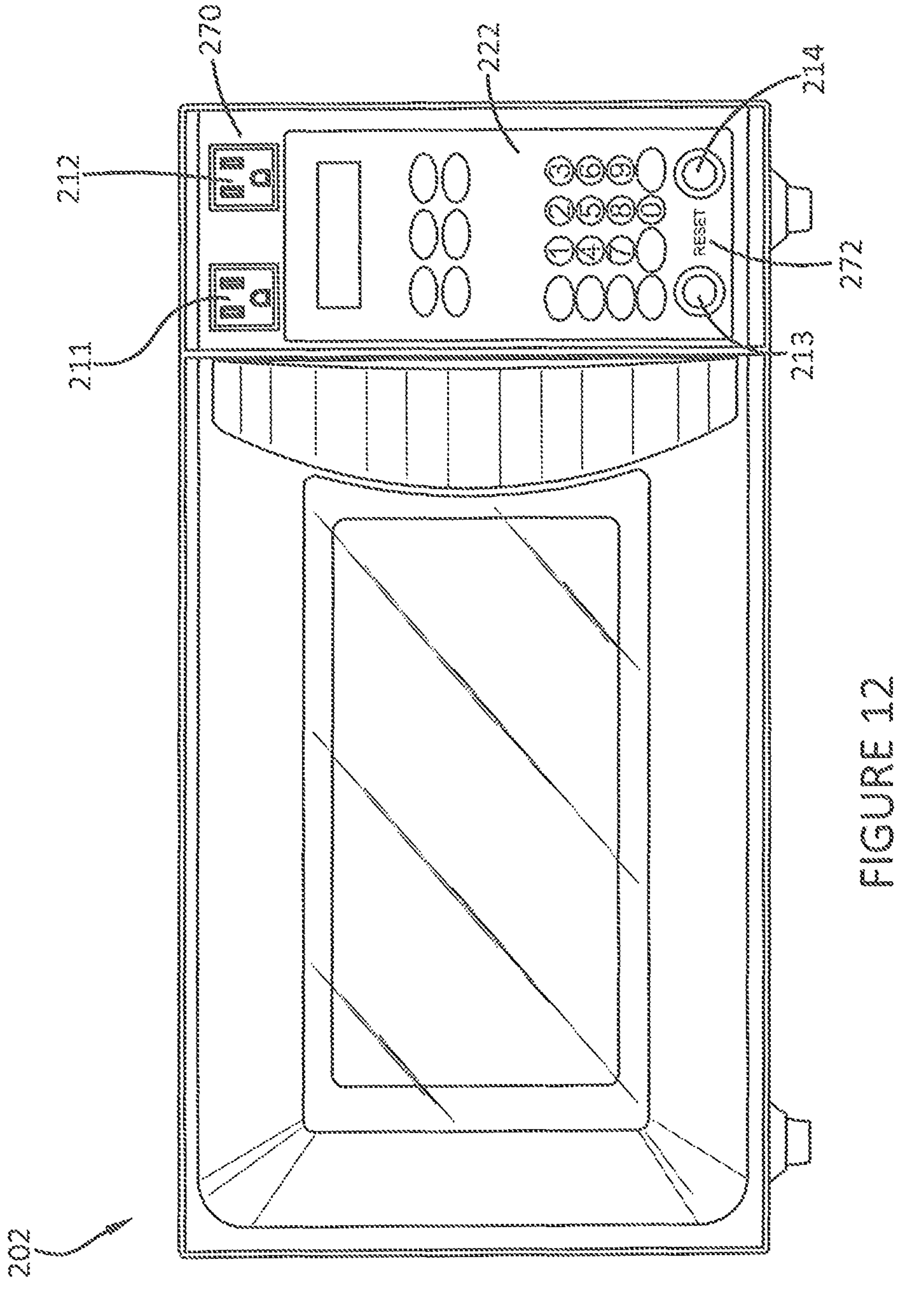
FIG. 12 is a front view of the microwave oven according to another arrangement.

In another exemplary arrangement as illustrated in FIGS. 12 and 13, the auxiliary outlets or electrical power receptacles 211, 212 may be included as part of the front control panel 222 of the microwave oven 202 and located on the upper portion 270 of the front control panel 222. The auxiliary outlets 211, 212, front control panel 222 and microwave oven 202 are similar to auxiliary outlets 11, 12, front control panel 22, and microwave oven 2 except as discussed below. In this exemplary arrangement, the auxiliary outlets 211, 212 are positioned side by side with respect to each other with each of the auxiliary outlets 211, 212 being at the same height as the other. The auxiliary outlet 211 of FIG. 12 may be associated with a status LED indicator and reset button 213, which is located on the lower portion 272 of the front control panel and in vertical alignment with the auxiliary outlet 211. The status LED indicator and reset button 213 may be caused by the control circuitry of the controller to be on during use and switched to a flashing mode to indicate that power is not available therefrom when the microwave oven 202 is drawing cooking power. The auxiliary outlet 212 of FIG. 12 may be associated with status LED and reset button 214, which is located on the lower portion of the front control panel and in vertical alignment with the auxiliary outlet 212. The status LED indicator and reset button 214 may be caused by the controller to be on during use and switched to a flashing mode to indicate that power is not available therefrom when the microwave oven 202 is drawing cooking power thereto is withdrawn. In another exemplary arrangement, the status LED indicator and reset button 213 may be caused to be off during the time power is available for use and switched on or to a flashing mode when the microwave oven is running and power thereto is withdrawn. Similarly, in another arrangement, the status LED indicator and reset button 214 may be caused to be off during power availability and switched on or to a flashing mode when the microwave oven is running or the refrigerator is running and the controller causes power not to be available. Other elements and operational features may be similar in structure and function as that of the arrangements shown in FIGS. 1-11. Thus, the same reference numbers will be used in this exemplary arrangement to indicate elements that are similar in the arrangements shown in FIGS. 1-11.

Smart technology may be integrated in some of the exemplary arrangements. For example, a user may be able to monitor and/or control the refrigerator 3 such as by turning it on and off remotely by a remote device 217. The remote device 217 may include a hand held device such as a cellular phone. The cell phone may also be a smart phone. In some exemplary arrangements, the refrigerator, the microwave and/or the controller may include circuitry suitable for communication in a wireless network. Such a wireless network may be established in the facility, residence, office or other location where the combined refrigerator and microwave appliance is operated. Such devices may include circuitry that enables transmission of wireless signals to and from such components. Such communications may include communications of operational properties such as operating status, temperature, programmed values or other information that is pertinent to the operational condition of the particular device. In further exemplary arrangements, circuitry may be operative to enable received wireless messages to modify the operational condition and/or the programming of the particular device.

For example in some exemplary arrangements, the user may be able to communicate from a wireless phone via cellular or WiFi connection to determine that the refrigerator is operating, the temperature therein, the operational status of the compressor or other items. Alternatively and/or in addition, the user may be able to remotely control components of the refrigerator. These may include, for example, the ability to remotely turn on the internal light within the refrigerator and to view the food items currently housed within the refrigerator via one or more electronic cameras positioned therein. This may enable a user, for example, to determine that they need to purchase additional groceries or other items for purposes of an upcoming meal or other activities. Alternatively and/or in addition, in some exemplary arrangements, instructions may be utilized to change the temperature within the refrigerator. This may be done, for example, to chill certain grocery items that may need to be cooled or frozen for certain purposes. Of course these approaches are exemplary.

Likewise the microwave oven may include interface circuitry which enables the remote monitoring of the condition of the microwave oven components via a remote wireless device. This may include, for example, determining the periods of past operation and current status of the microwave oven such as whether it is currently being used to cook items. Alternatively and/or in addition, the remote monitoring capabilities may include determining the programmed status of the controller of the microwave oven such as the controller being programmed to cook an item housed in the microwave oven at a set future time or for a particular duration at a particular power level. Alternatively and/or in addition, the remote operational capabilities associated with the microwave control circuitry may include the ability to turn on an internal light within the cooking chamber of the microwave oven and to view via a camera whether an item is contained therein. Further such remote capabilities may also include the ability to remotely change the program parameters so as to initiate cooking at a different time or at a different power level. Likewise exemplary arrangements may include having the wireless interface in operative connection with the at least one power control circuit to provide the ability to monitor the current status of power draw on auxiliary outlets, the occurrence of alarm conditions, or the current status of other connected devices. It should be understood that such capabilities may be implemented in the controller circuitry or in separate circuitry of the microwave oven and/or the refrigerator. Further the exemplary arrangements may utilize communications interface capabilities included in circuitry of the controller to facilitate monitoring and operational control of the appliance. Of course these capabilities are exemplary and in other arrangements, other approaches may be used.

Figure 14:
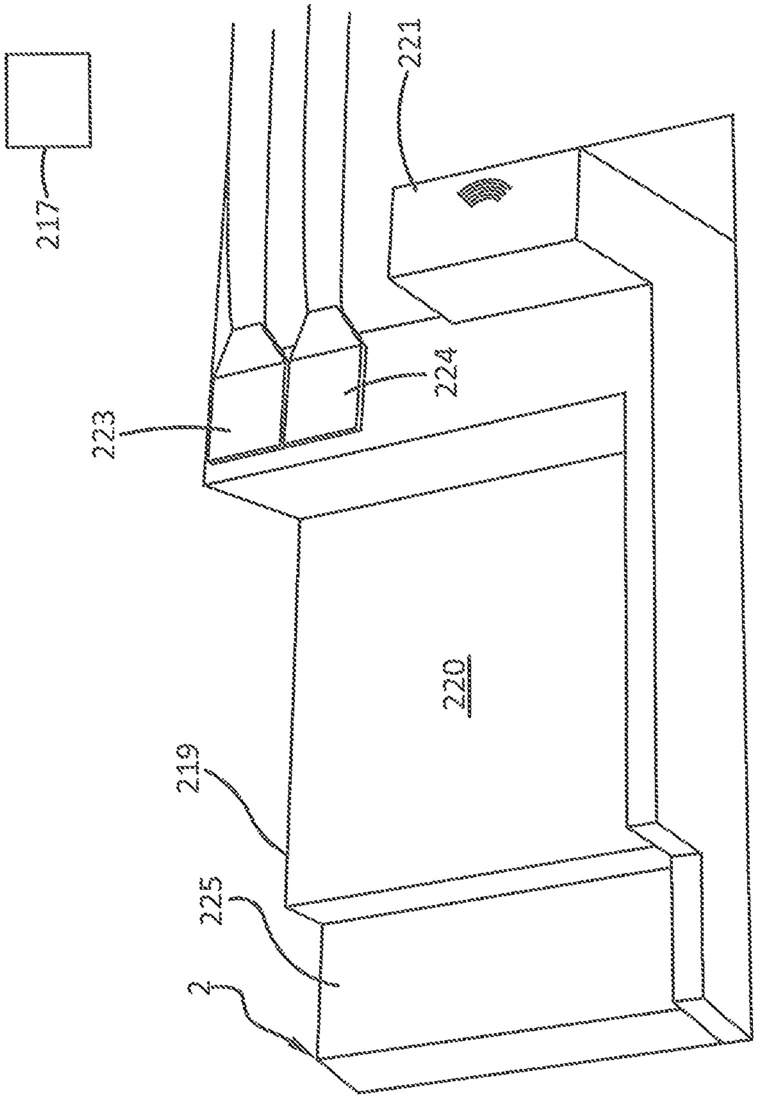
FIG. 14 is a top perspective view of a charging pad on the top portion of a microwave oven.

In an exemplary arrangement a charging pad 219 (FIG. 14) may be provided on the microwave oven 2 or other suitable location to receive a smart phone or other chargeable device for purposes of charging the device. For example, a wireless charging pad 219 may be positioned on top 225 of the microwave oven 2 for recharging the smart phone or other device. The charging pad 219 may be built into the top 225 of the microwave oven 2 or may be a separate component that is mounted to the top 225 of the microwave oven 2 or other location. The exemplary charging pad 219 includes an inductive charging pad and includes a recessed area 220 for receiving an item to be charged such as the smart phone. The at least one control circuit may include or be in operative connection with a wireless interface 221 configured for communicating with the remote control device 217 for controlling the microwave oven or refrigerator and work in conjunction with the control circuitry to perform functions such as removing the supply of electrical power to the microwave oven 2 and/or refrigerator 3. In an exemplary arrangement, USB ports 223, 224 may be provided in the area of the charging pad 219. Alternatively, or in addition, power outlets may be provided in proximity to the charging pad 219. Alternatively, the charging pad 219 may be provided on the front, side, rear or bottom of the microwave oven 2, or at another suitable location in connection with the combined appliance structure.

Figure 28:
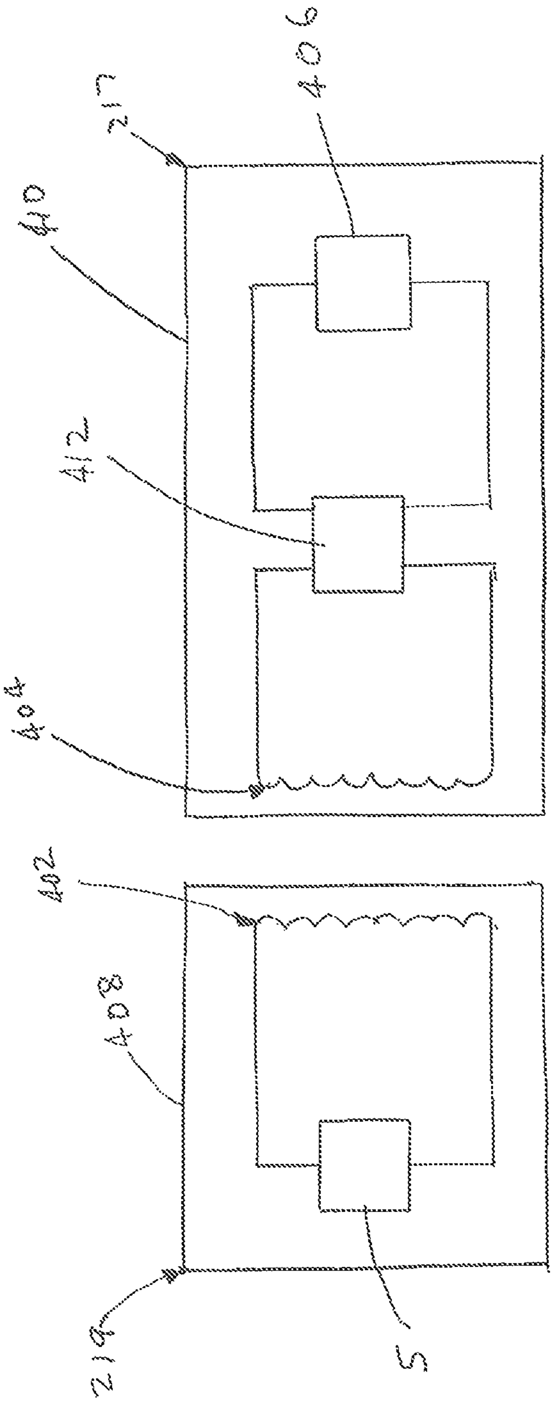
FIG. 28 is a schematic diagram corresponding to the arrangement of FIG. 14 showing the charging pad and a device being charged.

The exemplary charging pad 219 may utilize inductive or wireless charging, which uses an electromagnetic field to transfer energy between the charging pad 219 and the device being charged. In general, the charging pad 219 may include a primary inductive coil 402 (FIG. 28) in connection with circuitry that is operative to create an alternating electromagnetic field that is received by a secondary inductive coil 404 (FIG. 28) connected to the circuitry of the device being charged such as device 217. Power from the electromagnetic field is converted back into electric current to charge a battery 406 (FIG. 28) in the device. FIG. 28 shows an exemplary arrangement in which the charging pad 219 utilizes inductive charging to charge the device 217. In this arrangement, the charging pad 219 includes an inductive charging station 408 and the primary inductive coil 402. The power source 5 provides electrical power to the inductive charging station 408 and the other components of the charging pad 219.

The inductive charging station 408 is provided for inductively charging the device 217 and may be built into or otherwise attached to the charging pad 219. The inductive charging station 408 may include the primary inductive coil 402 that is connected to the power source 5 for the microwave oven 2. The recessed area 220 may define a cover of the charging pad 219 that covers the primary inductive coil 402 and provide a surface on which the remote device 217 may be placed for charging. The inductive charging station 408 may also include one or more capacitors coupled in series and/or parallel with the primary inductive coil 402 to form an LC circuit. The inductance value of the primary inductive coil 402 and the capacitance value of the capacitor or capacitors may be selected to achieve a desired resonant frequency which corresponds to a frequency of a coil and circuitry in the device being charged, but it should be noted that this exemplary arrangement is not limited to any particular inductance and/or capacitance values and/or any particular power source ratings.

The device 217 or other device to be charged may include the battery 406 that provides electrical power to the components and circuitry of the device. The battery 406 may comprise a rechargeable battery or batteries including lead acid, nickel cadmium (NiCad), nickel metal hydride (NiMHi), lithium ion (Li-ion) or lithium ion polymer (Li-ion polymer) batteries. The device may include any number of batteries, the size and rating of which may vary. The battery 406 may also comprise power conduits, connectors, receptacles, battery connectors, or power cables coupled with batteries.

The device 217 or other device to be charged may include an inductive charger 410 for charging the battery 406 when the device 217 is placed on or in the vicinity of the inductive charging station 408 of the charging pad 219. The inductive charger 410 may be built into or otherwise attached to the device to be charged. As schematically represented in FIG. 28, the inductive charger 410 may include the secondary inductive coil 404 and a charging circuit 412 that is connected to the battery 406. The inductance value of the secondary inductive coil 404 may be selected to correspond or complement the inductance value of the primary inductive coil 402, but it should be noted that in exemplary arrangements the secondary inductive coil is not limited to any particular inductance value. Likewise, the power rating of the charging circuit 412 may be selected to match or complement the rating of the battery 406. The two inductive coils 402, 404 in proximity combine to operate in a manner similar to the principles employed in an electrical transformer. Further in some arrangements greater distances between primary and secondary inductive coils and/or more effective charging can be achieved when the inductive charging system uses resonant inductive coupling. Of course the described approaches are exemplary and in other arrangements other approaches may be used. In some exemplary arrangements the charging pad may be in operative connection with the at least one control circuit that controls power availability to components of the device. For example, the control circuitry may operate in accordance with its programmed instructions to cause power to not be available to the charging pad when the microwave draws cooking power. Alternatively or in addition the control circuitry may be operative to cause power not to be available to the charging pad responsive to power draw by the refrigerator compressor, the auxiliary outlets or other items, and/or cumulative power draw of multiple items.

Figure 16:
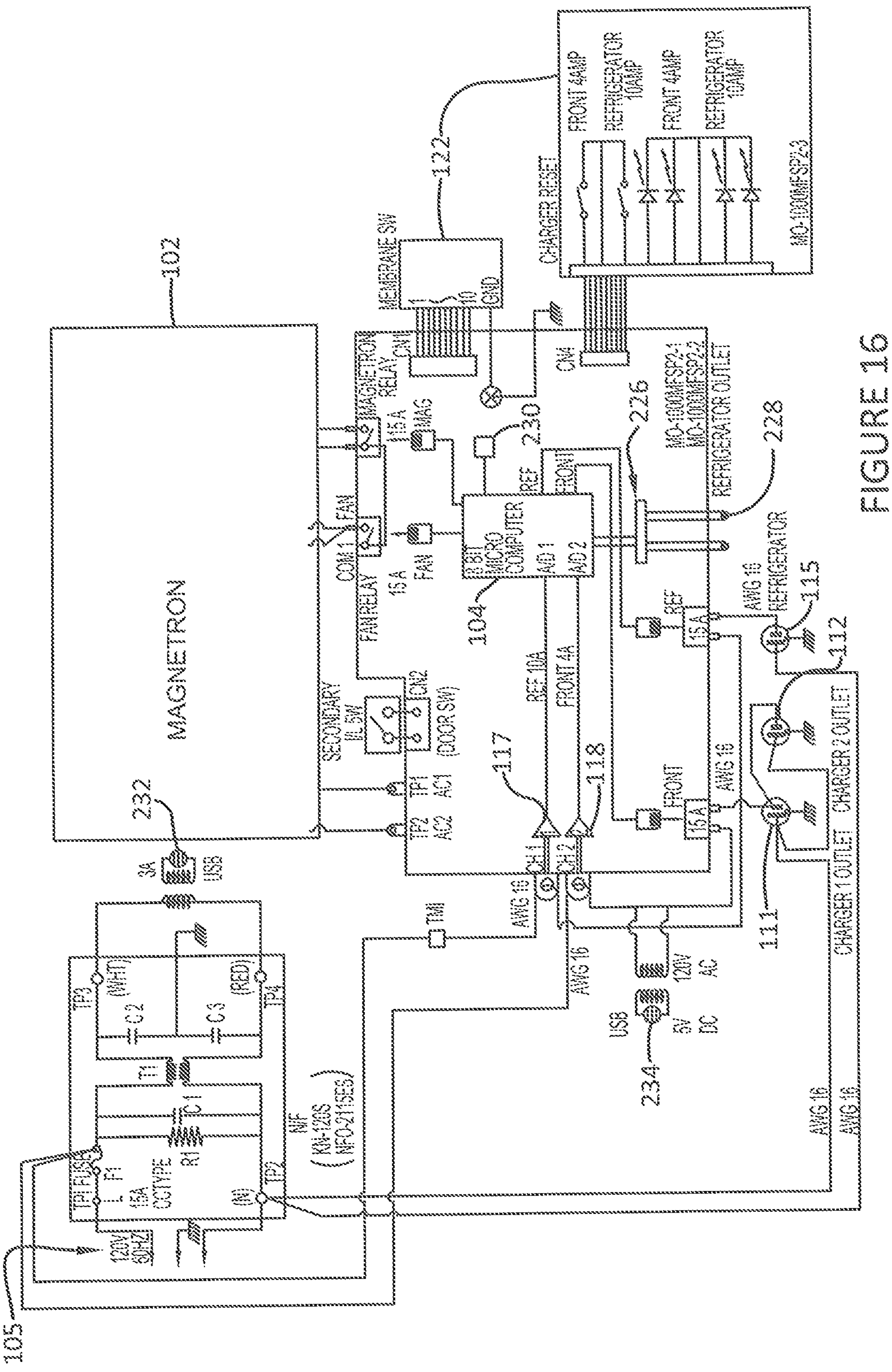
FIG. 16 is an electrical schematic diagram of the arrangement of FIG. 15.
Figure 18:
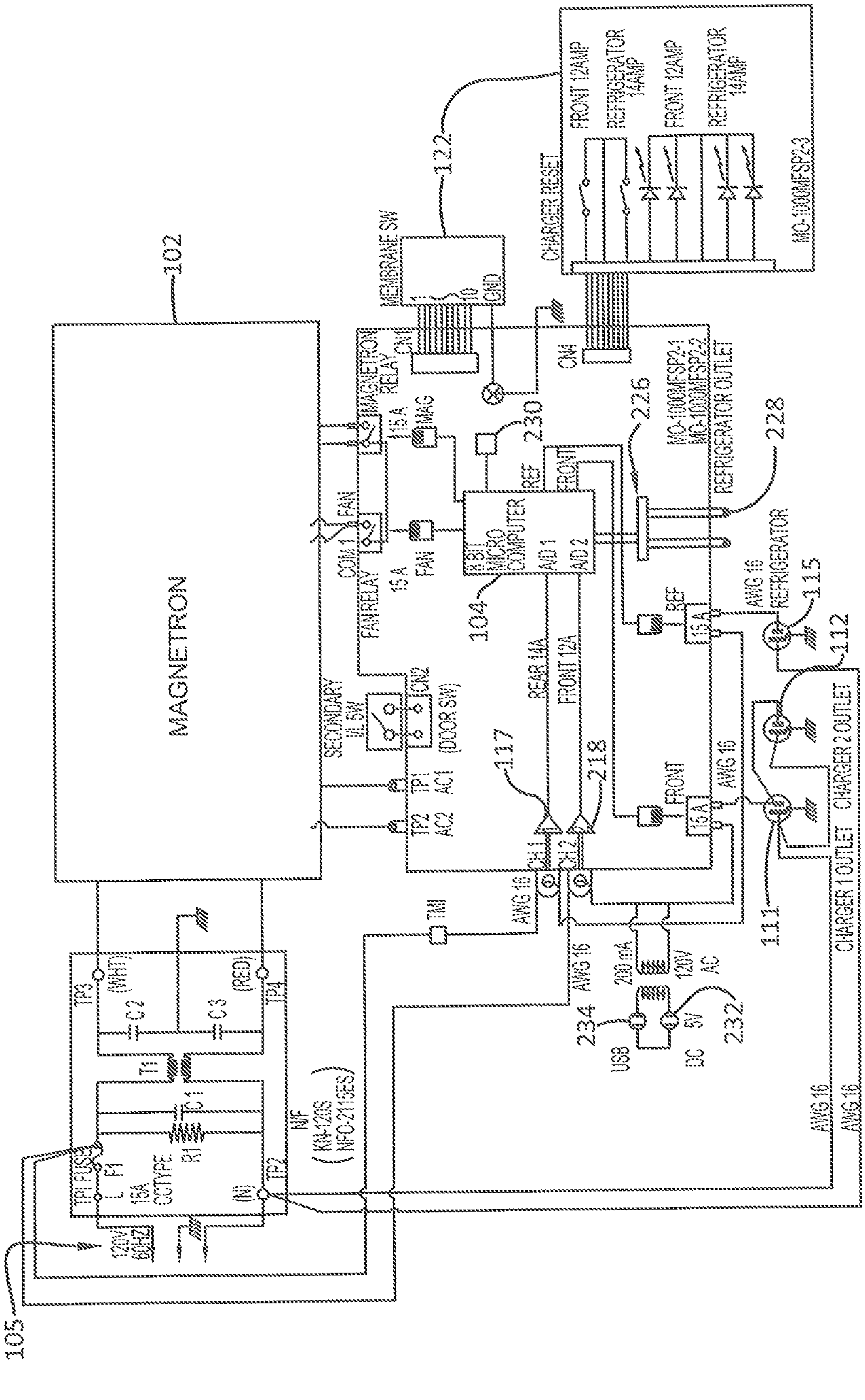
FIG. 18 is an electrical schematic diagram of the arrangement of FIG. 17.
Figure 20:
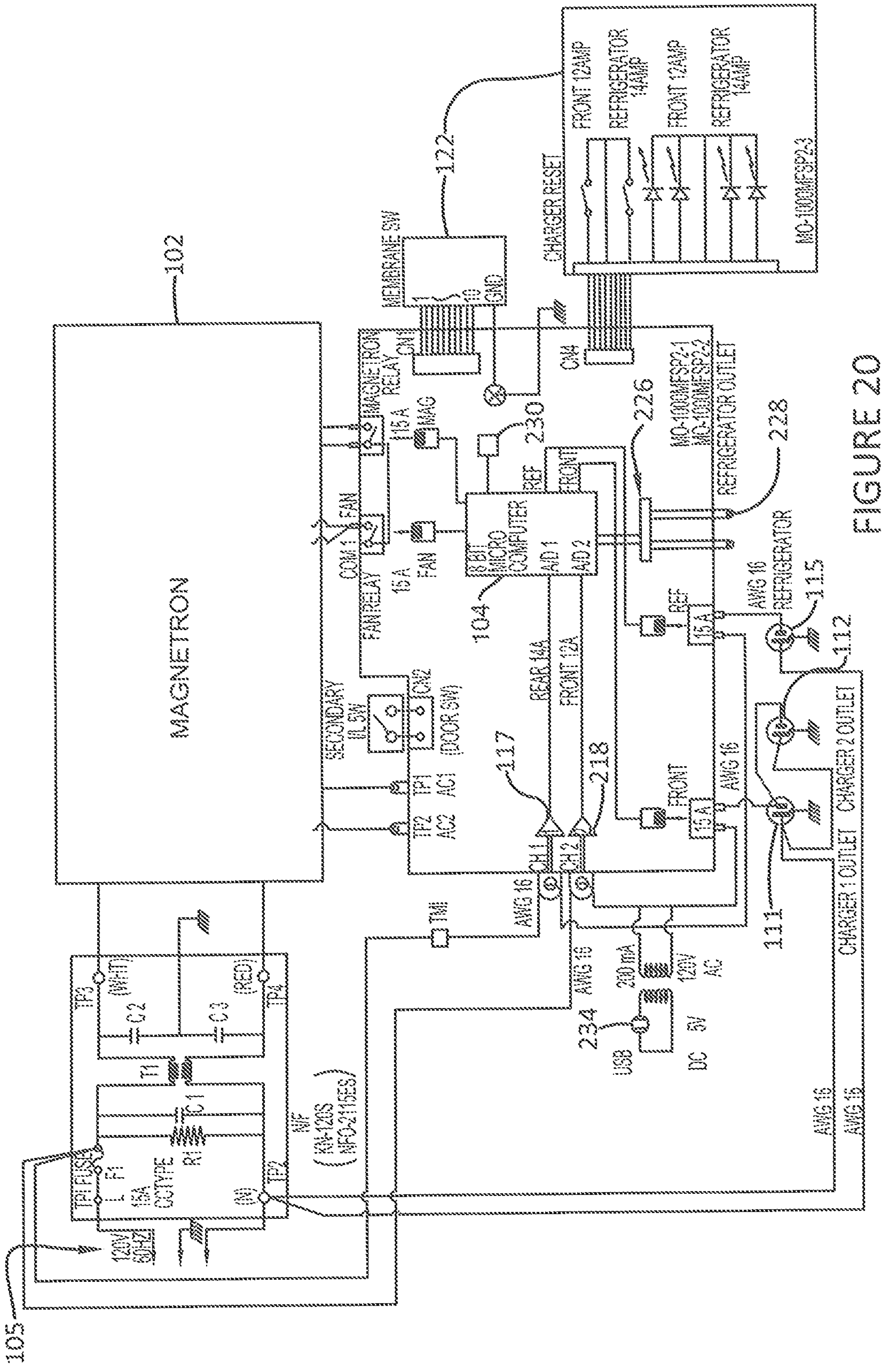
FIG. 20 is an electrical schematic diagram of the arrangement of FIG. 19.

As shown in FIGS. 16, 18, and 20, a safety sensor which is alternatively referred to herein as a safety circuit 226 such as a smoke or gas sensor may be provided in connection with the microwave oven 2. The smoke sensor 226 operates in connection with exemplary at least one control circuit to turn off the microwave oven upon sensing smoke or polluted air indicative of a potentially dangerous condition such as excessive smoke generated from overcooked food. The exemplary safety sensor 226 may be powered on or otherwise operational when the microwave oven is in operation. The sensor circuitry may operate responsive to processor executable instructions to determine the optimal activation point. The exemplary smoke sensor may be battery-powered or powered by the house current that powers the combined appliance with an optional battery backup when the power from the house current is out. The smoke sensor may include an ionization smoke sensor that uses a radioisotope, typically Americium-241, to ionize air. The exemplary ionization smoke sensor circuitry operates to turn off power to the magnetron cooking element of the microwave oven upon sensing a difference due to smoke indicative of a potentially dangerous condition. The smoke sensor alternatively may include a radiation type smoke detector that may contain a source emitter of infrared, visible, or ultraviolet light (typically an incandescent light bulb or light-emitting diode), a lens, and a photoelectric or other type of radiation sensing receiver (typically a photodiode) and suitable control circuitry.

An exemplary sensor 226 may include an alcohol sensor that is coupled with a thermistor 228. An exemplary alcohol sensor 226 may operate in a set temperature range, such as from 32 to 104 degrees Fahrenheit. When a set level of heating is sensed by the thermistor 228, the thermistor 228 through suitable control circuitry causes the alcohol sensor 226 to turn on and become operational and check for properties of the gas within the interior area of the microwave.

If the exemplary alcohol sensor 226 is operational due to the sensing of the set level of heating and senses polluted air that is indicative of a dangerous condition, a shutdown signal is outputted by the alcohol sensor to the controller 104. Upon receiving the shutdown signal, the controller 104 determines that the radiation cooking emitting element of the microwave oven 2 should be shut down and causes the magnetron of the microwave to shut down through the withdrawal of electrical power. If (after the alcohol sensor is caused to be turned on by the thermistor) the alcohol sensor 226 senses air that is not indicative of a dangerous condition such as the air produced by normal cooking of food in the microwave oven 2, the alcohol sensor circuitry will not send a shutdown signal to the controller 104 and the controller allows the microwave cooking activity to continue.

Alternatively or in addition, a fault indicator 230 may be coupled to the control circuitry of the controller 104 or other circuitry to indicate that there is a dangerous condition upon detection by the alcohol sensor 226. For example, the fault indicator 230 may be an audible indicator such as a buzzer that is activated in response to the alcohol sensor 226 sensing polluted air indicative of a dangerous condition. In another example, fault indicator 230 may include the display 124 displaying a fault message such as "E-1" in response to the alcohol sensor 226 detecting polluted air indicative of a dangerous condition. Alternatively the fault indicator may output one or more signals, such as wireless alarm signals that can be detected by a receiver of an alarm system or through a remove device such as a smart phone.

An exemplary arrangement may include a combination of fault indicators. For example, upon the alcohol sensor 226 sensing air that is indicative of a dangerous condition, a shutdown signal is outputted by the alcohol sensor 226 to the controller 104. Upon receiving the shutdown signal, the controller 104 determines that the microwave oven 2 should be shut down and causes the radiation emitting cooking element of microwave oven 2 to be shut down. In addition in an exemplary arrangement, a buzzer is activated and the display 124 displays a fault message such as "E-1" in response to the alcohol sensor 226 sensing polluted air indicative of a dangerous condition.

The alcohol sensor 226 may be reset automatically responsive to the alcohol sensor 226 no longer detecting gas indicative of the dangerous condition. Alternatively or in addition, the alcohol sensor 226 may be reset upon sensing by a suitable switch, opening of the microwave door 9 of the microwave oven 2. The display may display a "bar" or other suitable icon to indicate that the alcohol sensor 226 is turned on. Other types of suitable safety sensors may also be used instead of the alcohol sensor to detect a dangerous condition within the cooking area of the microwave.

In addition to one or more sensors which detect the gases generated from cooked food, the sensor 226 may include a temperature sensing capability such as, for example, using the thermistor 228 and related elements mentioned above.

Figure 24:
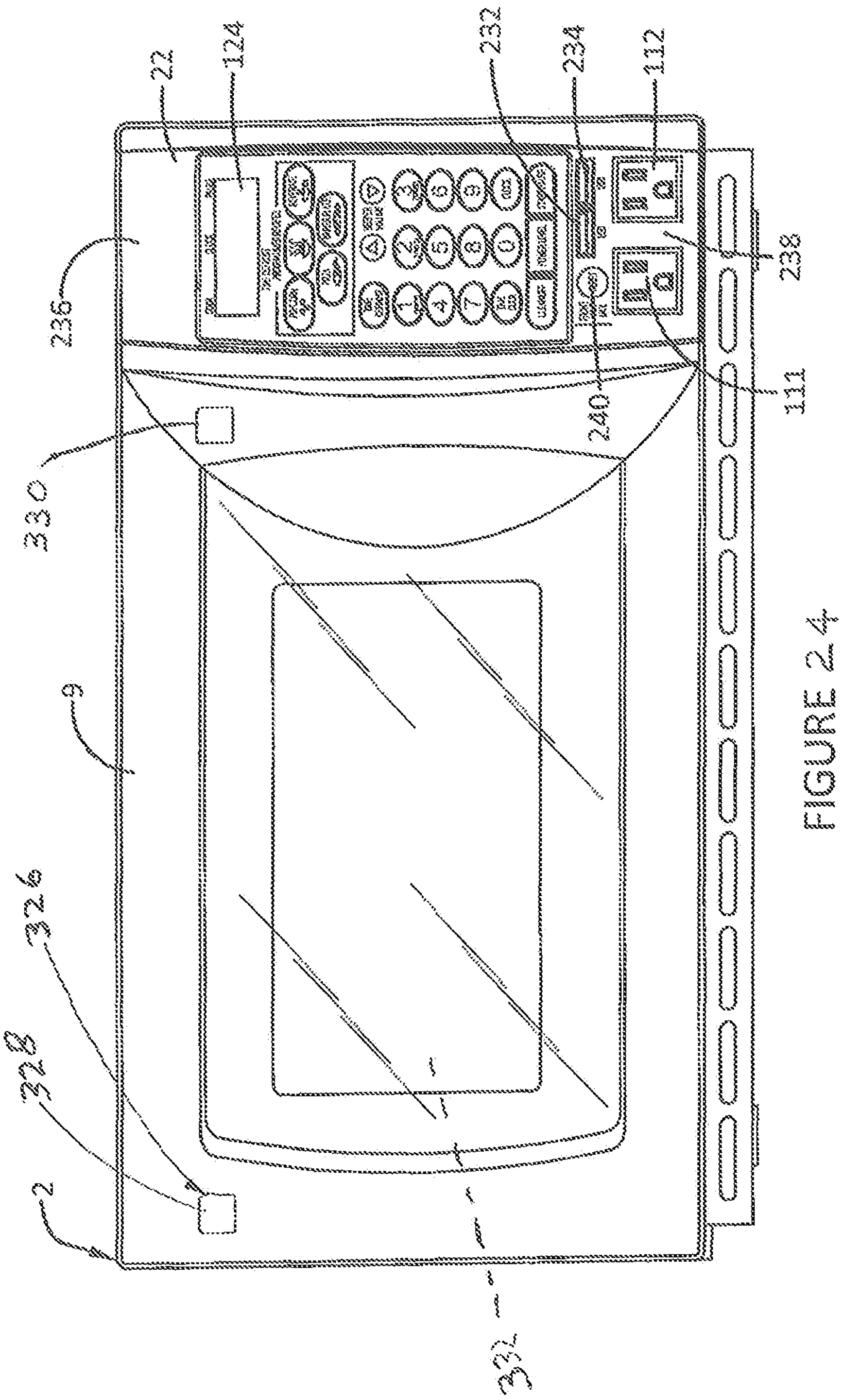
FIG. 24 is a front view of the microwave oven according to another exemplary arrangement

Referring to FIG. 24, in another exemplary arrangement, the safety sensor which is alternatively referred to as a safety circuit may comprise an infrared sensor 326. The infrared sensor 326 may include two oppositely positioned infra-red disposed infrared sensor elements in the form of a sensor emitter 328 and sensor receiver 330 (schematically shown in FIG. 24) provided on the microwave oven and located in the microwave's cavity 332. The exemplary infrared sensor 326 operates as follows. The sensor emitter 328 emits radiation and the sensor receiver 330 senses sensor radiation from the sensor emitter 328 while the microwave element operates during a cooking session. When smoke that is indicative of a dangerous condition passes in between the infrared sensor elements 328, 330, a determination is made by the safety circuit that a transmission amount of sensor radiation from the sensor emitter reaching the sensor receiver has fallen by at least a programmed threshold amount during the cooking session, due to smoke in the cooking interior area. Responsive to the determination, the cooking element of the microwave oven is caused by the safety circuit to be no longer supplied with electrical power. The exemplary safety circuit may use the smoke point of oil or similar food products as the basis for its threshold amount, so that normal smoke emitted during the cooking or heating of food or beverages will not cause the infrared sensor 326 to deactivate cooking operation. The exemplary infrared sensor 326 would not require interaction from the microwave user. The exemplary safety sensor may be operative to cause an initial transmissivity level of sensor radiation that reaches the sensor receiver from the sensor emitter early in the cooking session to be stored in a data store or other memory associated with the safety circuit. The determination of a level of smoke corresponding to a dangerous condition is made in this embodiment responsive to circuitry operating in accordance with programmed instructions to detect that the transmission amount of sensor radiation reaching the sensor receiver has dropped by the threshold amount from the initial transmissivity level during the cooking session.

Figure 25:
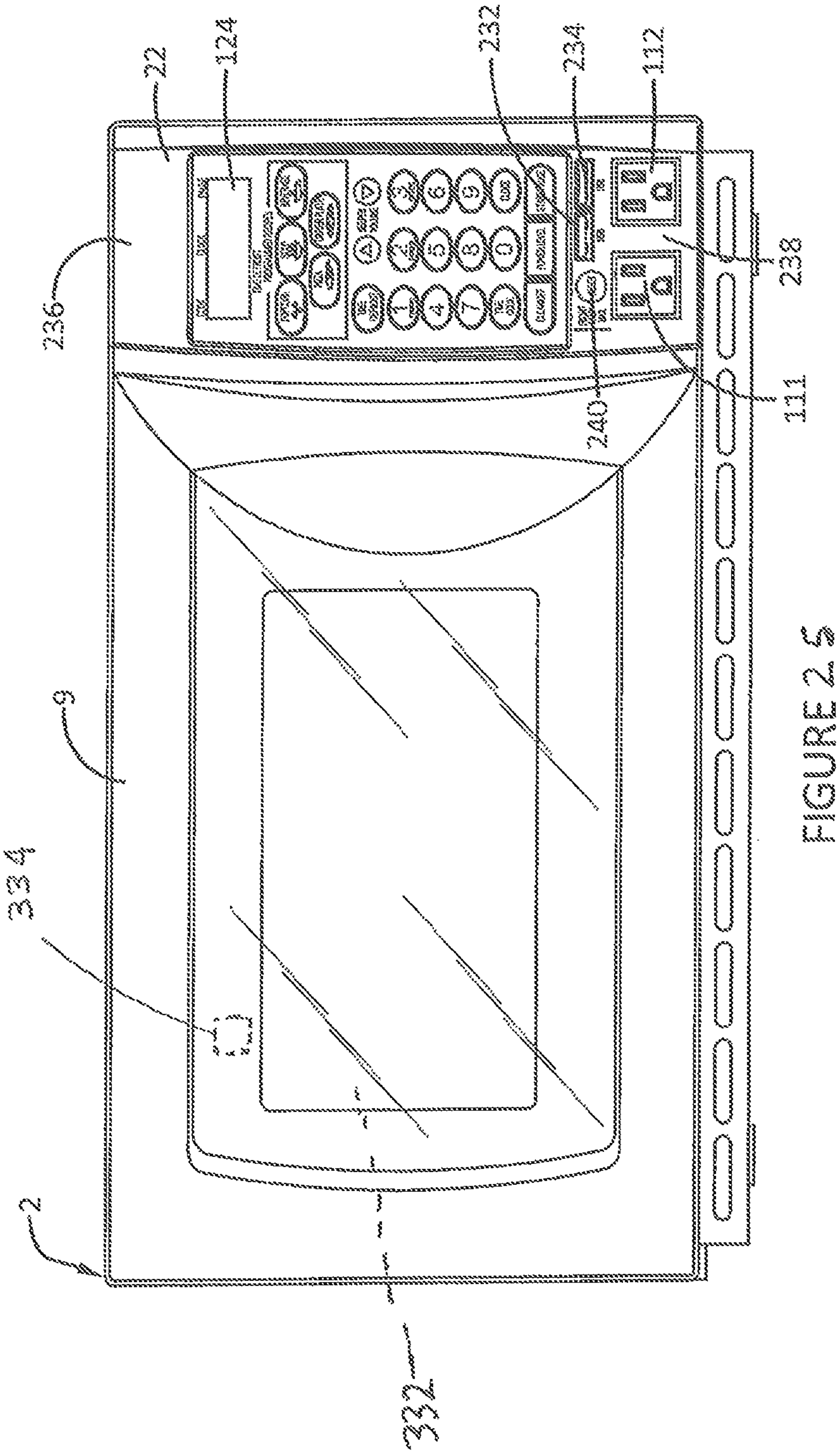
FIG. 25 is a front view of the microwave oven according to another arrangement.

Referring to FIG. 25, in another exemplary arrangement, the safety sensor or safety circuit may comprise a light sensor 334, which detects the increase smoke density within the microwave's cooking area which is alternatively referred to as a cavity. The light sensor 334 may also include a sensor emitter and sensor receiver. The light sensor 334 may be provided in the microwave cavity 332 and may operate as follows. At the beginning of a cooking cycle, the light generated travels through the clean air to the light sensor 334. As smoke increases in density, the amount of light that reaches the sensor receiver is reduced. The circuitry of light sensor 334 includes a programmed trip point or threshold that corresponds to the reduced amount of light sensed caused by the amount of smoke, that is indicative of a dangerous condition. When the trip point is reached, the safety circuit causes the electrical power to the radiation emitting cooking element to be withdrawn. A circuit determination would be made based on the amount of smoke that corresponds to the trip point and its corresponding light sensor reading.

Figure 26:
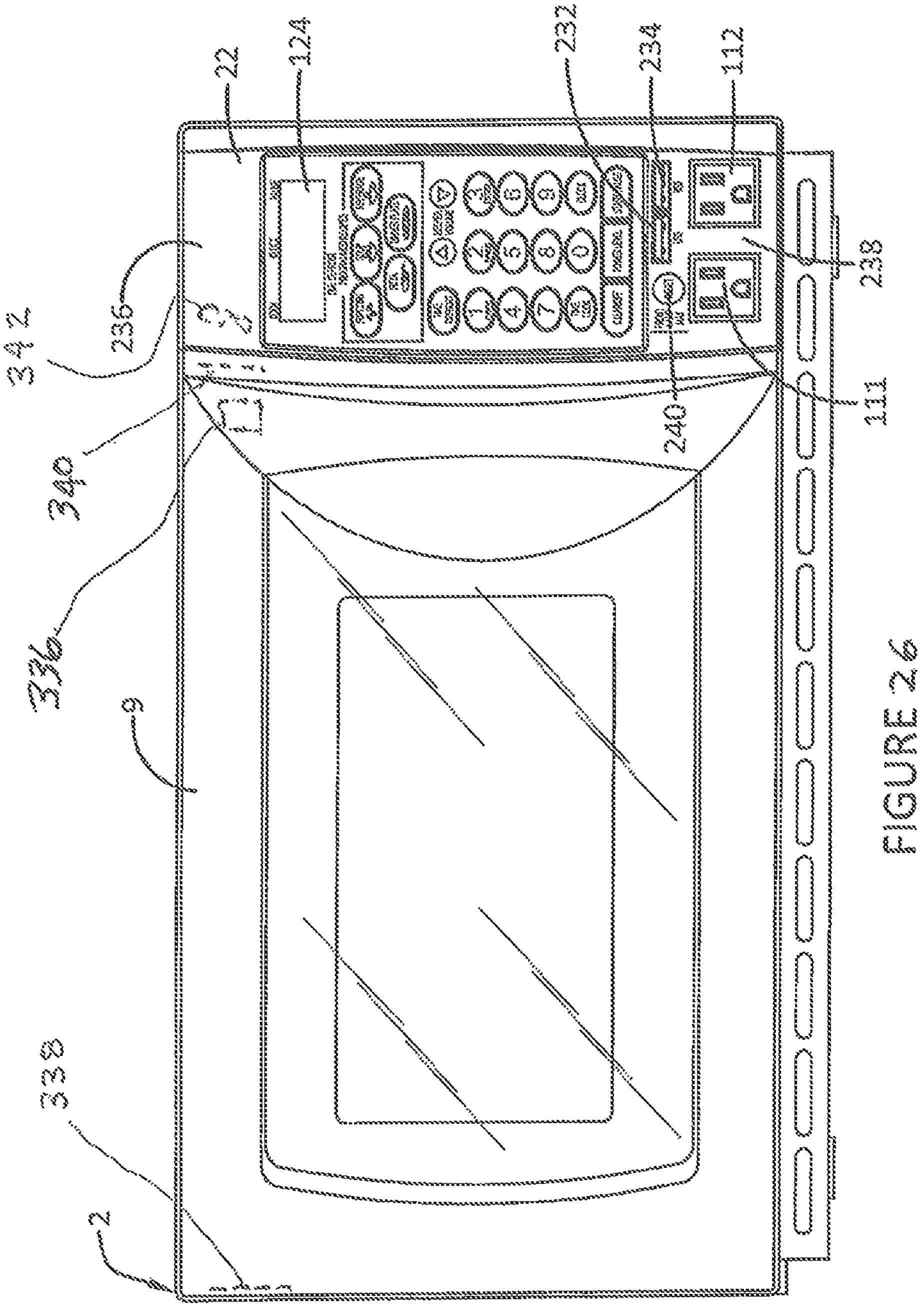
FIG. 26 is a front view of the microwave oven according to another exemplary arrangement.

Referring to FIG. 26, in another exemplary arrangement, the safety sensor may include an optical motion sensor 336. The optical motion sensor 336 may also include a sensor emitter and sensor receiver. The optical motion sensor 336 may be positioned in the microwave cavity 332 adjacent air exhaust vents 338, 340 of the microwave, which comprises an air passage that connects an area where food is cooked in the microwave oven to the air outside the housing of the microwave oven. The optical motion sensor 336 detects motion which is sensed due to the presence of smoke blown by an exhaust fan 342 of the microwave oven 2 through the air passage. The exhaust fan 342 is operative to cause air to move in the air passage connected to the microwave cavity. In an exemplary arrangement, the sensor emitter and sensor receiver are positioned to be operative to sense the transmission of radiation between the emitter and the receiver in the air passage. The optical motion sensor 336 has a trip point or threshold that corresponds to the presence of smoke of a predetermined density that corresponds to a reduced level of transmission that is indicative of a dangerous condition. When the trip point is reached, the optical motion sensor in combination with the control circuitry causes the cooking element of the microwave oven to be turned off. It should be noted that the exemplary optical motion sensor is not be positioned within the microwave cavity and directed toward a turntable therein, since the turntable itself may result in false alarms in some configurations. Of course it should be understood that other types of smoke sensors may be positioned in air passages in other alternative arrangements.

Alternative arrangements may include other types of smoke sensors. For example, some arrangements may include sensors that are operative to detect smoke by determining the level of volatile organic compounds (VOCs) in the air in the microwave oven cooking area. In some exemplary arrangements such VOC sensors may be positioned to sense air in at least a portion of the microwave cooking area. In some cases such VOC sensors may be positioned in an air passage that extends between the microwave cooking area and the air in the atmosphere outside the microwave. Such an arrangement may have an advantage in that positioning the sensor in the air passage may minimize the amount of cooking splatter and other contamination from the food cooked in the microwave oven that reaches the sensor.

Some exemplary arrangements may include a VOC sensor that comprises a tin dioxide semiconductor gas sensor. In some arrangements the semiconductor is formed on an alumina substrate with a thick film heater of ruthenium oxide on the reverse side. Of course this configuration is exemplary and in other arrangements other configurations and VOC sensor types may be used.

In exemplary microwave oven arrangements VOC sensors may be operated in conjunction with at least one suitable control circuit to detect conditions which correspond to a dangerous smoke condition. Such a dangerous smoke condition is determined responsive to the level of VOCs, such as carbon dioxide and/or carbon monoxide in the air in the cooking area of the microwave oven. Such compounds may generally indicate the presence of combustion which is corresponds to a potentially dangerous condition. Responsive to detecting a threshold VOC concentration in the air of the cooking area, the control circuitry in operative connection with the sensor is operative to cause power to be withdrawn from the magnetron of the microwave oven so as to prematurely end a current cooking session before the set and time thereof. In exemplary arrangements, the sensitivity of the VOC sensors is sufficient to detect a developing potentially dangerous condition and cause power to be withdrawn from the microwave cooking element before a fire or other condition causes damage to the microwave oven. This enables the sensor circuitry to reset when the dangerous smoke condition is no longer detected and enable the microwave oven to operate in a subsequent cooking session.

In some exemplary arrangements multiple sensors in operative connection with detection circuitry is utilized to determine the activation point for an alarm condition based on detection of parameters such as humidity, temperature, temperature rate of change, and gas constituents generated during cooking phases. Combinations of absolute and relative values and rates of change thereof may be detected for purposes of evaluating possible alarm conditions. Other types of sensors that may be used in exemplary arrangements include flame sensors. Flame sensors are operative, detect and provide signals indicative of the presence of a flame or fire. Upon the flame sensor detecting the presence of a flame, the flame sensor causes at least one control circuit to discontinue electrical power to the microwave oven cooking element. In some arrangements the flame sensor may take the form of an optical flame sensor. The flame sensor may be of the type that utilizes ionization current flame detection. Alternatively, the flame sensor may be of the type that utilizes thermocouple flame detection.

Alternatively or in addition, the fault indicator 230 may be coupled to the controller 104 or other circuitry to indicate that there is a dangerous condition upon detection of a potentially dangerous condition by any of the infrared sensor 326, light sensor 334, optical motion sensor 336, or flame or fire sensor in the arrangements described above. For example, the fault indicator 230 may be an audible indicator such as a buzzer that is activated in response to the safety sensor 226 sensing polluted air indicative of a dangerous condition. In another example, fault indicator 230 may include the display 124 displaying a fault message such as "E-1" in response to the safety sensor 226 detecting polluted air indicative of a dangerous condition.

Exemplary arrangements may include a combination of fault indicators. For example, upon the trip point or threshold value being reached by any of the detection circuitry of the infrared sensor 326, light sensor 334, or optical motion sensor 336, a shutdown signal is outputted by the sensor 226 to the controller circuitry 104. Upon receiving the shutdown signal, the controller 104 determines that the microwave oven 2 should be shut down and causes electricity to be withdrawn from the cooking element. In addition, a buzzer is activated and the display 124 displays a fault message such as "E-1" in response to the sensor 226 sensing polluted air indicative of a dangerous condition. In other exemplary arrangements, the controller or other circuitry may be operative to output signals that can be communicated to a remote location, indicative of an alarm condition that is detected through one or more detection circuits of the microwave oven or other connected devices. This may include, for example, the circuitry dispatching messages to a remote device such as a smart phone of a user. The messages caused to be dispatched responsive to operation of the control circuitry may be indicative of an alarm condition that can be output on the display of the user's device to advise that a potentially dangerous condition exists. Alternatively and/or in addition, the control circuitry may be operative to communicate messages to a central controller or alarm panel located in the facility or institution in which the microwave is operated. For example the circuitry may be operative to provide wireless communication to an alarm panel or central monitoring station which receives the information that there is a potentially dangerous condition at the microwave device located in a particular location, dormitory room or other identified area of the building or facility. In still other exemplary arrangements, messages corresponding to alarm conditions that are cause to be sent by the control circuitry of exemplary arrangements may be dispatched to devices or alarm monitoring stations of a security force for an oversight authority within the area in which the microwave is operated. Of course it should be understood that these approaches are exemplary and in other arrangements, other approaches may be used.

Exemplary arrangements may also include the features described in U.S. patent application Ser. No. 15/239,378 filed Aug. 17, 2016 which is published as US Patent Publications 2017-0059233 the disclosure of which is incorporated herein by reference in its entirety. In some exemplary arrangements an appliance like that shown in the incorporated disclosure may include a safe which is suitable for holding valuables or a user's rechargeable devices such as a smart phone. In some exemplary arrangements the safe may include a smoke sensor, heat sensor, flame sensor or other type sensor that is operative to detect a fire or other dangerous condition within the interior area of the safe. Further in exemplary arrangements the at least one control circuit or other circuitry may be operative to dispatch messages to a user's smart phone or other remote computer device to indicate such a fire or other dangerous condition within the interior area of the safe. In addition in exemplary arrangements the at least one control circuit or safe circuitry as described in the incorporated disclosure, may operate an audible alarm to give at least one audible signal of the dangerous condition. Also in exemplary arrangements messages may be dispatched to alarm monitoring stations associated with the building or institution in which the appliance is located. Further in exemplary arrangements a remote notification to a user's mobile device or other computer and/or to an alarm monitoring station may also be given in circumstances in which at least one tamper sensor of one of the types of the incorporated disclosure is operative to sense a safe tamper condition. In such circumstances the at least one safe circuit or other circuitry may be operative to cause a remote notification of the tamper condition to be given and/or an audible signal to be output from an audible alarm. Further in exemplary arrangements one or more cameras may be in operative connection with the control circuitry to provide to the user's mobile device or other remote computer and/or to an alarm monitoring station, images associated with the detected condition. These may include images captured by cameras with a field of view outside the safe or the microwave oven or refrigerator of the combined appliance. Alternatively or additionally in other arrangements cameras may be positioned to capture images of an interior area of the safe. In some arrangements this may include a camera that is operative to have a field of view directed at or through the safe opening so that in the event that the safe is opened by an unauthorized person, images of the individual who is responsible for breaking into the safe may be captured. Further in exemplary arrangements the signals may be provided by the safe circuitry which can operate on a battery if the safe is disconnected from the combined appliance and no longer receives power from the at least one power control circuit thereof. Further the safe circuit may also provide GPS or other position signals so that the location of the safe can be tracked. Of course it should be understood that these approaches are exemplary and other arrangements other approaches may be used.

The exemplary detection circuitry of the smoke sensor, infrared sensor 326, light sensor 334, or optical motion sensor 336, may be reset automatically upon the sensor not detecting gas or other conditions that are no longer indicative of the dangerous condition. Alternatively or in addition, the sensor may be reset upon circuitry sensing opening of the microwave door 9 of the microwave oven 2. The display may display a "bar" or other suitable icon to indicate that the sensor is turned on. Other types of suitable safety sensors and circuitry may also be used to detect dangerous conditions. Further in other exemplary arrangements, other circuitry may be in operative connection with the combined appliance or separate components so as to address dangerous conditions. Such items may include, for example, a suitable fire extinguishing system that may be automatically triggered in response to detecting conditions corresponding to fire or smoke within the cooking chamber of the microwave oven. For example in some exemplary arrangements, a compressed supply of carbon dioxide may be included with or be positioned adjacent to the combined appliance. A suitable gas conduit and control valve may be positioned to deliver the carbon dioxide into the cooking chamber of the microwave oven responsive to the detection of flame, excessive temperature or smoke within the microwave cooking chamber. Suitable circuitry in operative connection with the controller or circuitry of the temperature, smoke or flame detection devices may operate to cause the control valve for the delivery of the carbon dioxide or other fire extinguishing material to be opened to cause the delivery thereof responsive at least in part to the detection of one or more of the alarm conditions. Further as can be appreciated, in some exemplary arrangements, the control circuitry may operate in accordance with its programmed instructions to require that the alarm condition be detected as existing for a programmed period of time before the control circuitry operates to cause the fire extinguishing material to be delivered into the cooking chamber. Further although exemplary arrangements may include carbon dioxide as the fire extinguishing material, in other embodiments other types of fire extinguishing or fire suppressing materials may be utilized. These may include, for example, chemical fire extinguishing or retarding materials in the form of powders or foams. Alternatively, and/or in addition, fire suppressing materials may include the delivery of nonflammable gaseous material. Of course these approaches are exemplary and in other embodiments, other approaches may be used.

Figure 15:
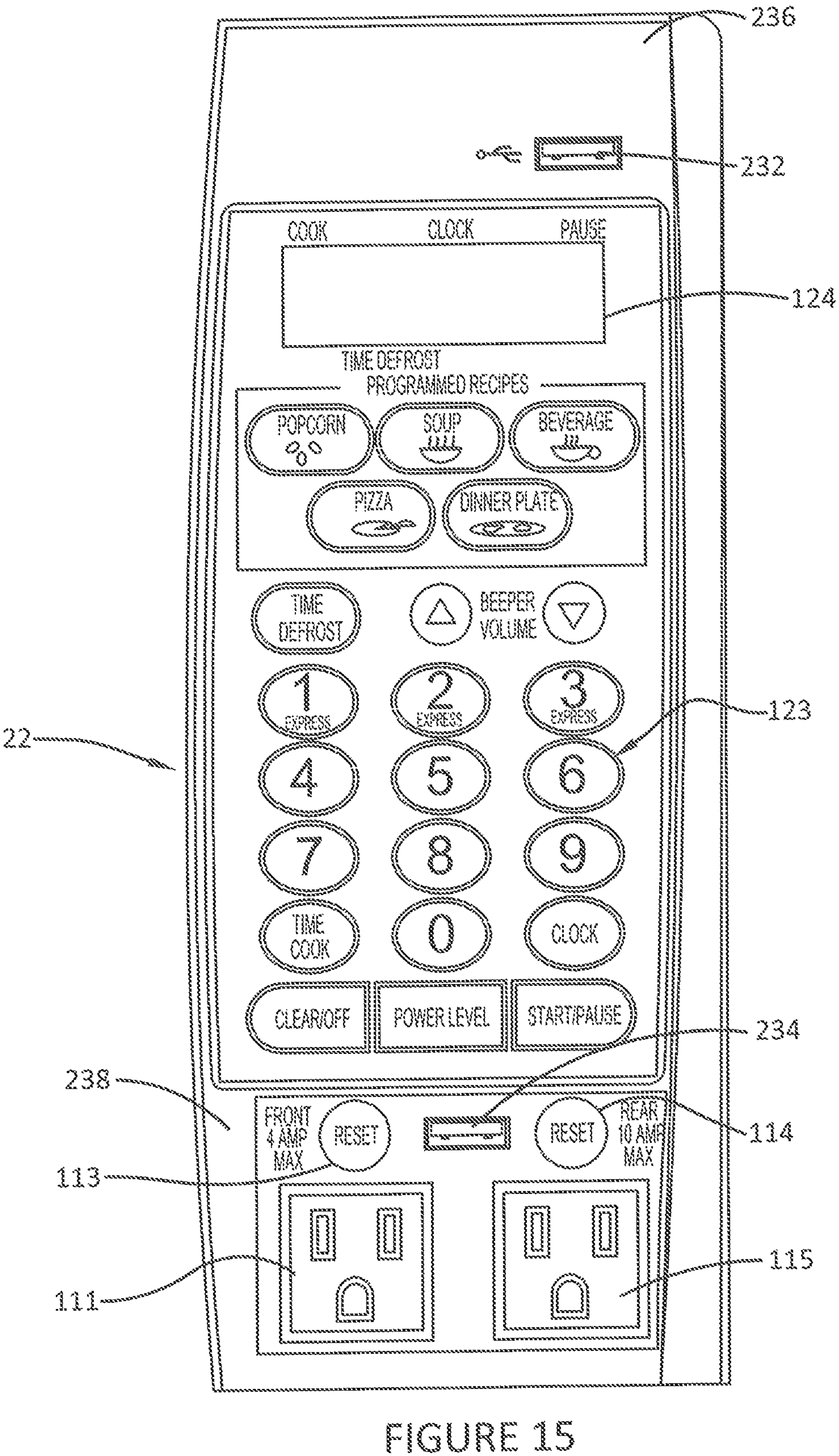
FIG. 15 is an illustration of a control panel of an alternate arrangement.
Figure 27:
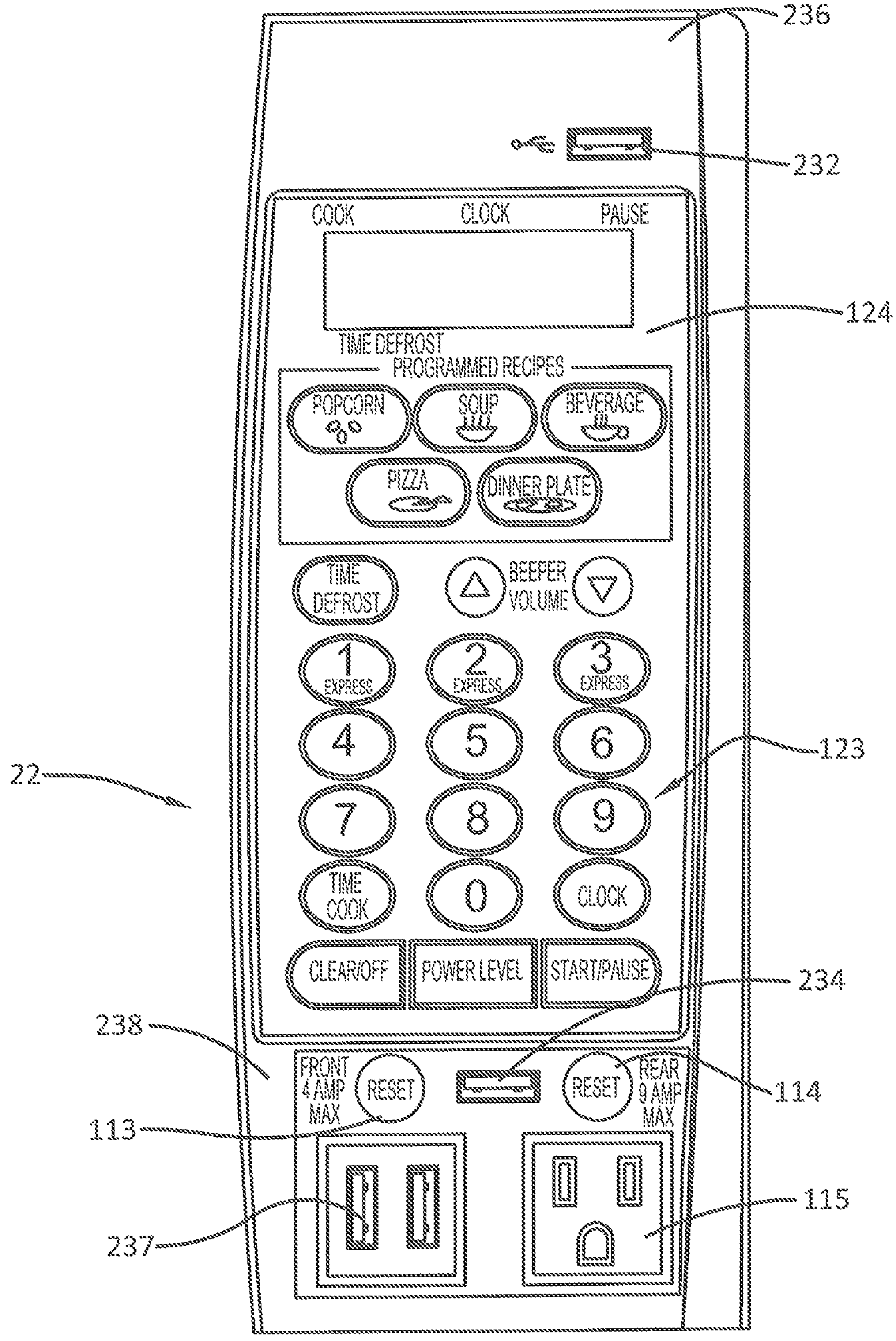
FIG. 27 is an illustration of a control panel of an alternate arrangement.

As shown in FIGS. 15, 16 and 27, the exemplary front control panel 22 of the microwave oven 2 may include Universal Serial Bus (USB) ports 232, 234 for connection, communication, and power supply between the front control panel 22 and electronic devices such as a personal computer, cell phone, Smart Phone, Ipod®, Ipad®, or other suitable device to allow communication and/or charging of the electronic device plugged into the USB ports. In one exemplary arrangement, a first USB port 232 may be provided on the upper portion 236 of the front control panel 22, and a second USB port 234 may be provided on the lower portion 238 of the front control panel 22 above the auxiliary outlets 111, 112 and between the reset buttons 113, 114 as seen in FIG. 15. The first USB port 232 may be operatively connected to a three ampere fuse and a linear time-variant system (LVT) of 100 mA, 120 volts, and 12 watts. The second USB port 234 may be operatively connected to a linear time-variant system (LVT) of 200 mA, 120 volts, and 24 watts. The second USB port 234 may also be reset. The current sensor 118 may be constructed to limit the second USB port and the two auxiliary outlets to 12 amps. The USB ports 232, 234 may be in operative connection with respective printed circuit boards. Alternatively, as represented in FIG. 27, instead of auxiliary outlet 111, another USB port 237 may be provided on the front panel 22 at the location of the auxiliary outlet 111. Alternatively or in addition, one or more USB ports may be provided on the rear of the microwave oven, the sides of the microwave oven, and/or the top or bottom of the microwave oven. Alternatively or in addition, one or more auxiliary outlets may be provided on the rear of the microwave oven, the sides of the microwave oven, and/or the top or bottom of the microwave oven. Alternatively, the refrigerator outlet may be provided on the top, bottom, or one of the sides of the microwave oven.

Figure 17:
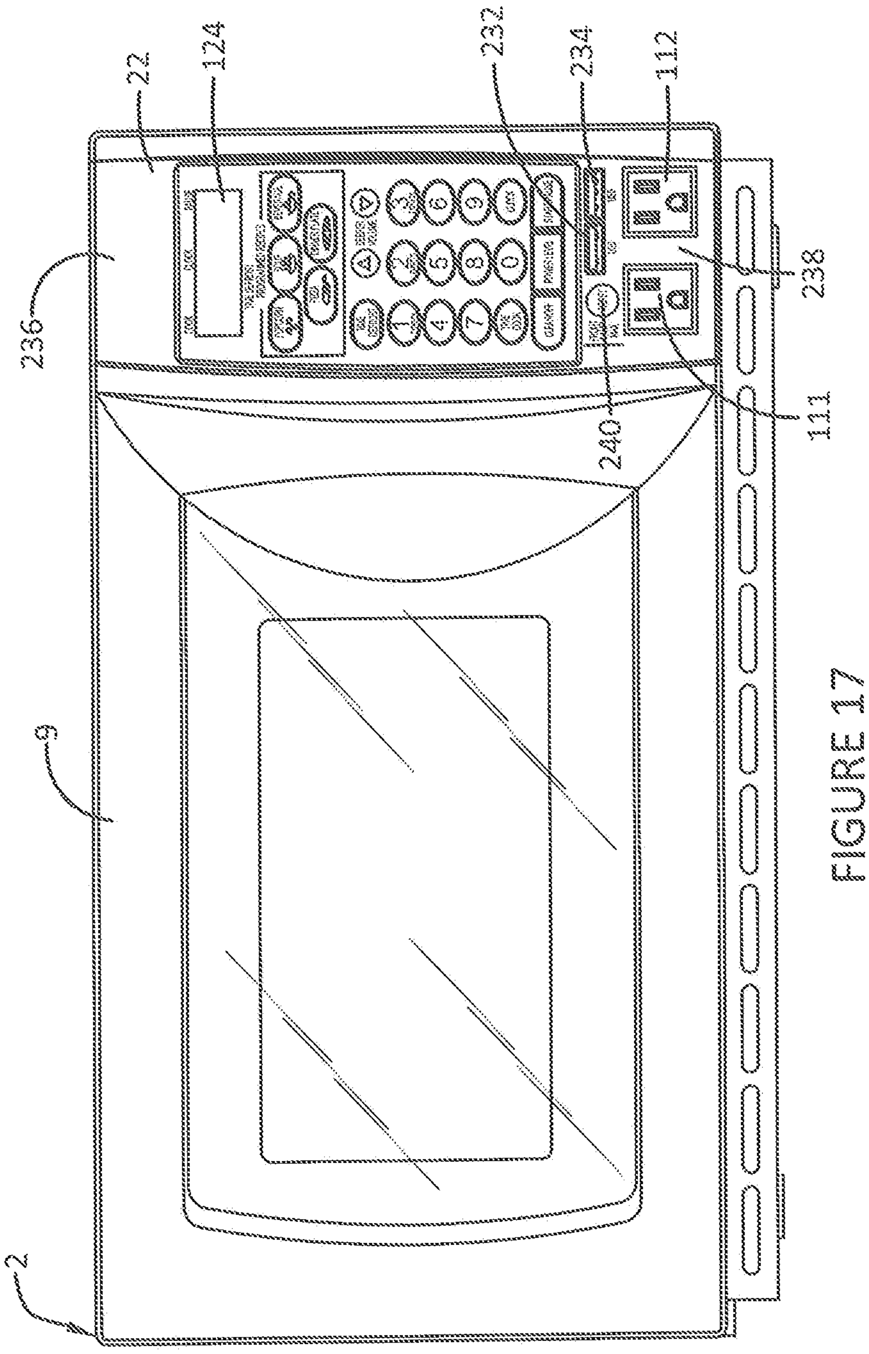
FIG. 17 is a front view of the microwave oven according to another exemplary arrangement.

FIGS. 17 and 18 show another exemplary arrangement of a control panel and control circuitry that includes USB ports 232, 234. In this arrangement, the first and second USB ports 232, 234 are located side by side on the lower portion 238 of the front control panel 22 above the auxiliary outlets 111, 112. The USB ports 232, 234 are also located rightwardly (as viewed in FIG. 17) adjacent a status LED indicator and reset button 240. In this exemplary arrangement, current sensor 218 is configured to monitor the combined current in the USB ports 232, 234 and the auxiliary outlets 111 and 112. The current sensor 218 is constructed to limit the combined current in the USB ports and auxiliary outlets 111 and 112, to 12 amperes. The LED indicator and reset button 240 may be controlled to illuminate when power to the auxiliary outlets 111, 112 and the USB ports 232, 234 is available and flash when disabled. In another arrangement, the LED indicator and reset button 240 may be controlled to be off when power to the auxiliary outlets 111, 112 and the USB ports 232, 234 is available and light on illuminate or flash when disabled. In an exemplary arrangement, depressing the LED indicator and reset button 240 enables power delivery from the auxiliary outlets 111, 112 and the USB ports 232, 234 so that power may be again supplied from them after a power interruption due to excessive power draw, when the combined current draw falls from above to below the limit. Of course it should also be understood that in exemplary arrangements, the controller or other control circuitry that operates to avoid excessive power draw may also operate to discontinue delivery of power from the receptacles and the USB ports in circumstances where the power draw of the microwave cooking element and/or the refrigerator compressor requires the power delivery from the auxiliary outlets and USB ports be discontinued. In such exemplary arrangements, the control circuitry may operate to automatically resume the delivery of power to such receptacles and ports or in other embodiments a manual input may be required to cause the delivery of power to be reinstituted. Of course it should be understood that these approaches are exemplary and in other arrangements other approaches may be used.

Figure 19:
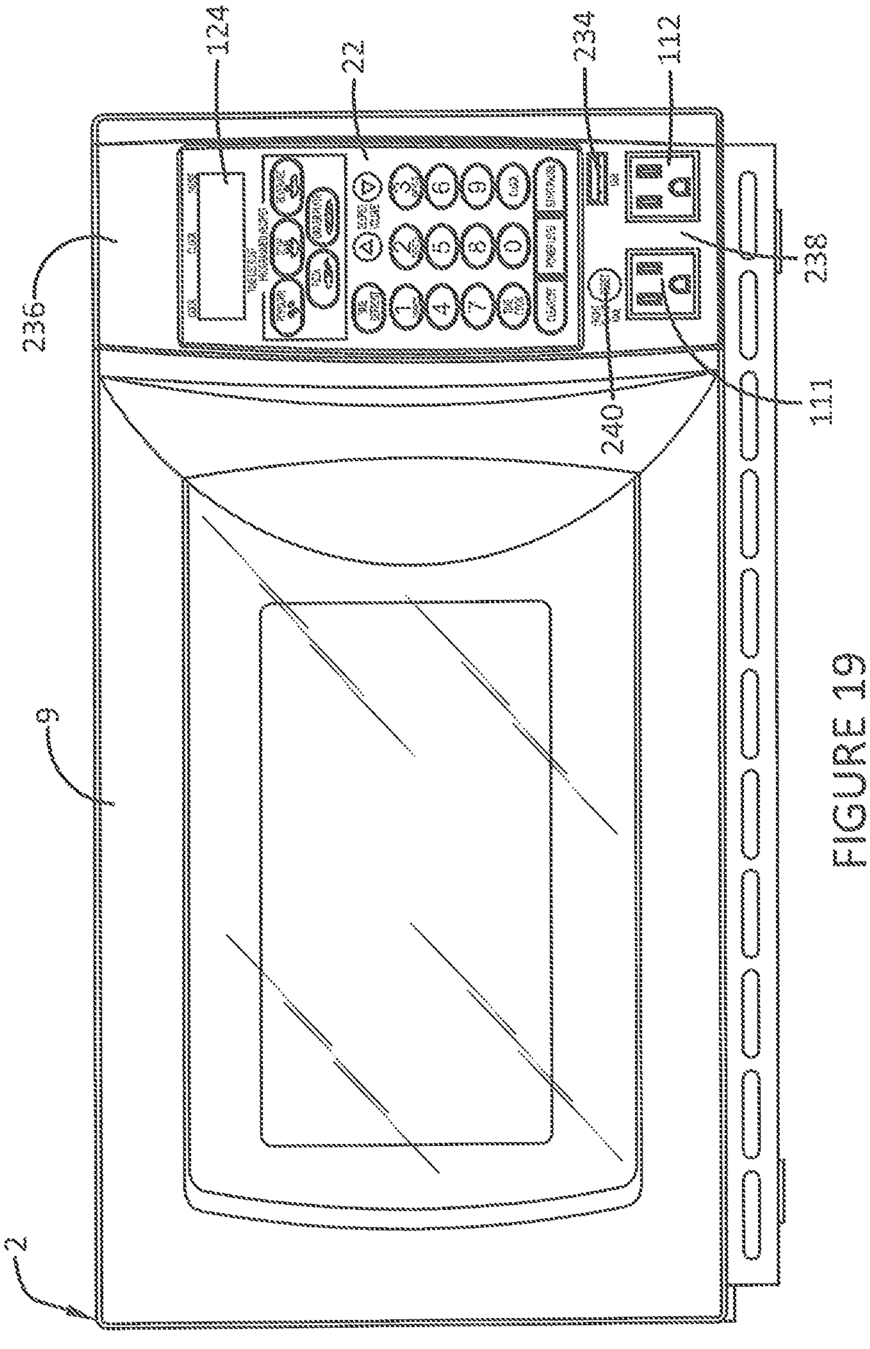
FIG. 19 is a front view of the microwave oven according to another exemplary arrangement.

FIGS. 19 and 20 show an alternative arrangement in which one USB port 234 is located above the auxiliary outlets 111, 112 and rightwardly adjacent the status LED indicator and reset button 240. In this exemplary arrangement, the current sensor 218 is configured to monitor the combined current draw from the USB port 234 and auxiliary outlets 111 and 112. The current sensor 218 is configured to limit the combined current draw from the USB port 234 and auxiliary outlets 111 and 112, to 12 amperes. Alternatively, the current sensor 218 may be configured to limit the combined current in the USB port 234 and the auxiliary outlets 111 and 112 to 13 amperes. The LED indicator and reset button 240 may be controlled to illuminate when power to the auxiliary outlets 111, 112 and the USB port 234 is available, and flash when the control circuitry causes the outlets and ports to be disabled. In another exemplary arrangement, the LED indicator and reset button 240 may be off when power to the auxiliary outlets 111, 112 and the USB port 234 is available, and illuminate or flash when disabled. In an exemplary arrangement, depressing the LED indicator and reset button 240 enables operation of the auxiliary outlets 111, 112 and the USB port 234 so that power may be again supplied from them after the controller discontinues the supply of power thereto when the combined current draw falls from above to below the limit. Of course as is the case with the previously described arrangement, the controller and other circuitry may be operative to also discontinue the supply of electrical power to the auxiliary receptacles and/or USB ports when power draw is required for the magnetron of the microwave or the refrigerator compressor is sensed that power delivery to other devices needs to be discontinued to limit excessive power draw. In such circumstances, the discontinuance of power to the auxiliary receptacles and USB ports may be automatically reinstated responsive to operation of the controller. Alternatively, in other arrangements, manual inputs may be required from a user to reinstitute the electrical delivery therefrom. Further in some exemplary arrangements, the controller may be configured so as to require manual inputs to reinstate electrical delivery only under circumstances where excessive power draw above the limits from the one or more auxiliary outlets or USB ports has occurred, thus requiring a manual input to reinstitute the electrical power delivery therefrom. Of course these approaches are exemplary and in other arrangements other approaches may be used. Other elements of the arrangements of FIGS. 17-20 may be similar in structure and function as the arrangements shown in FIGS. 1-11. Thus, the same reference numbers are used in describing these exemplary arrangements to indicate elements that are similar to elements or components in the arrangements shown in FIGS. 1-11.

Figure 21:
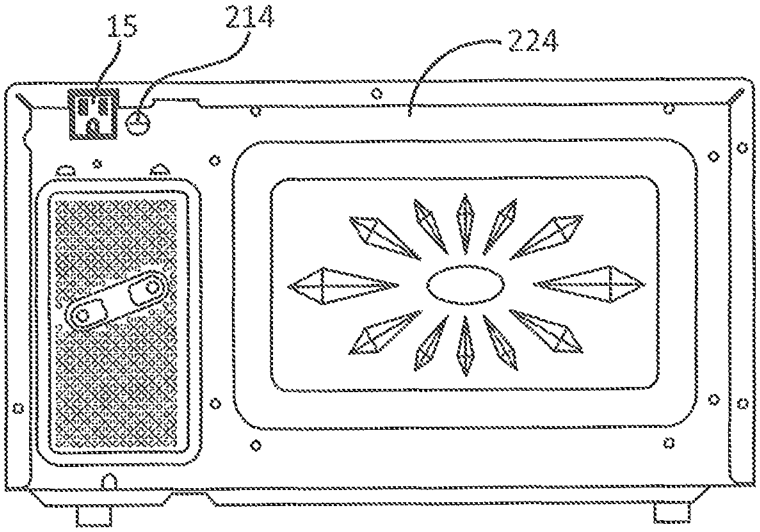
FIG. 21 is a rear view of the microwave oven according the arrangements of FIGS. 12-19.
Figure 22:
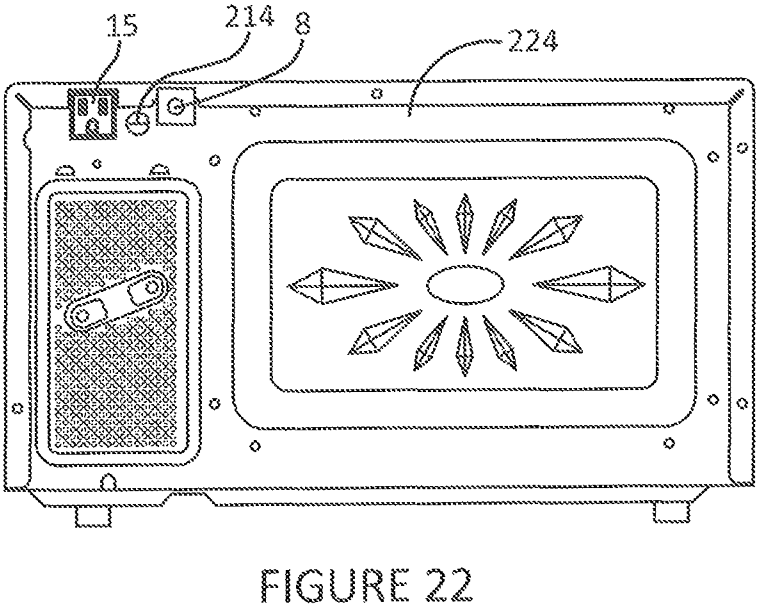
FIG. 22 is a similar view as that of FIG. 21 except that the AC cord is shown.

FIG. 21 shows the rear portion 244 of the exemplary microwave oven of the arrangements shown in FIGS. 12-20. Refrigerator outlet 15 is shown on and accessible from the rear portion 244 of the microwave oven and is associated with the LED indicator and reset button 214, which is also provided on the rear portion 244 of the microwave oven. FIG. 22 is a similar view as FIG. 21 except that an AC electrical cord 8 for the microwave oven is shown.

In the arrangements shown in FIGS. 12-22, control models for control logic may be established for execution of executable instructions by the controller or microprocessor which is also referred to herein as at least one electrical power control circuit 4. These models can be in the form of processor executable instructions stored in a computer readable medium, such as software or firmware within the control circuit 104. The exemplary models and logic flow are, in the first instance, dependent on the state of operation of the microwave oven 2. The current demands of the microwave oven 2 are generally the most significant contribution to overload. To avoid overload conditions, in exemplary arrangements power to the low power receptacles or auxiliary outlets, refrigerator receptacle, and/or USB ports is disabled during microwave operation.

Figure 23:
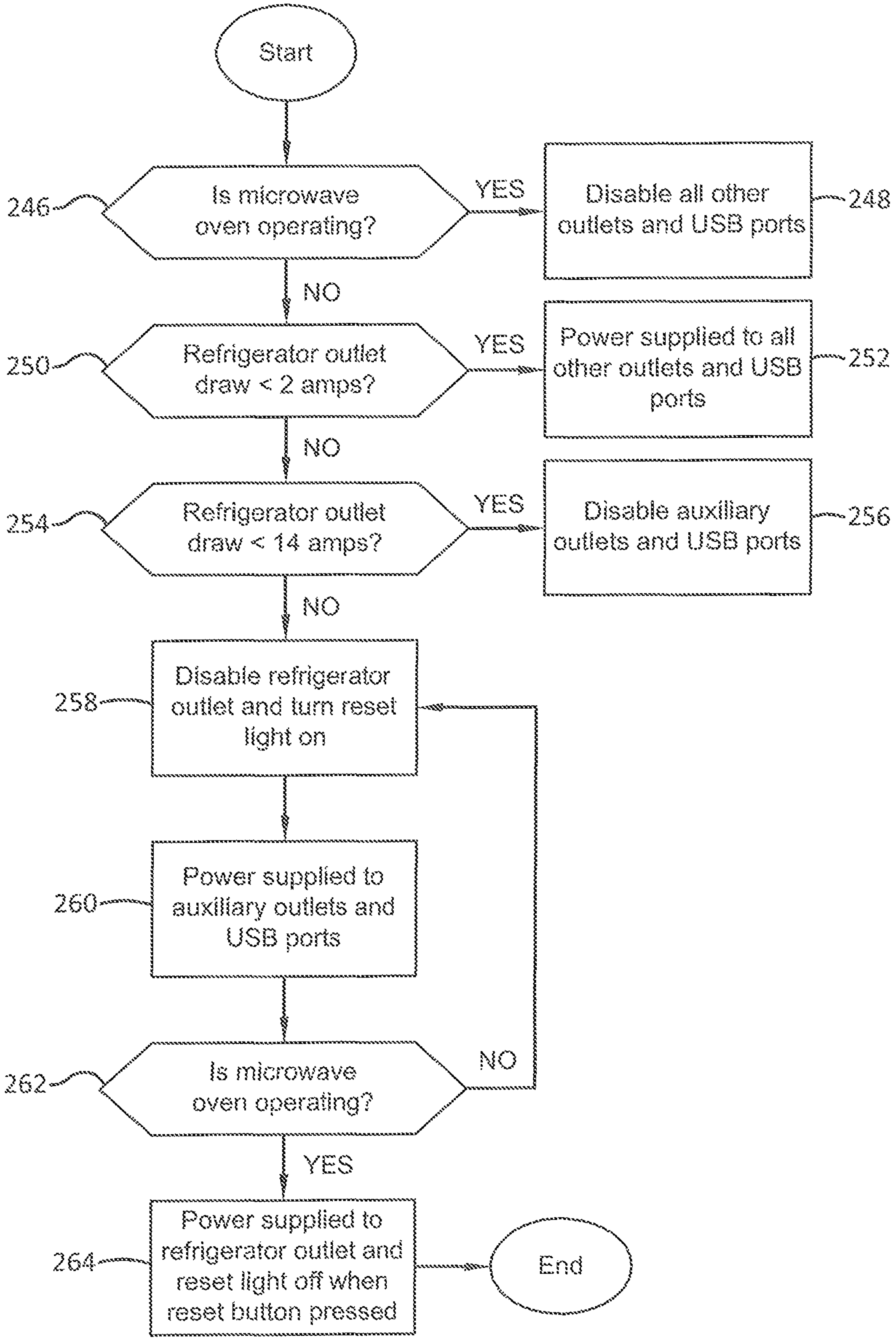
FIG. 23 is a schematic logic flow diagram of an exemplary arrangement.

FIG. 23 shows a flow chart illustrating several control models for operational scenarios. The at least one power control circuit 104 begins by determining whether the microwave oven is turned on or operating (e.g. cooking) in step 246. When the microwave oven is turned on and operating to perform cooking, the rear refrigerator outlet 15, the two auxiliary outlets 111, 112 on the front control panel 22, and the two USB ports 232, 234 on the front control panel are all turned off or disabled, so that the total draw of current for the combination microwave and refrigerator is not over 15 amperes as indicated in step 248.

When the microwave oven is not drawing cooking power and items are plugged into the two USB ports 232, 234, two auxiliary outlets 111, 112, and rear refrigerator outlet 15, then the exemplary at least one control circuit 104 determines whether the refrigerator outlet 15 is drawing less than 2 amperes (approximately the average amperes when the refrigerator compressor is running) in step 250. If the refrigerator outlet 15 is drawing less than 2 amperes, then all the outlets 15, 111, 112 and USB ports 232, 234 are caused to be enabled, so that power may be supplied through them as indicated in step 252. If the refrigerator outlet 15 not drawing less than 2 amperes, the at least one control circuit 104 determines whether the refrigerator outlet 15 is drawing less than 14 amperes in step 254. If the refrigerator outlet 15 is drawing less than 14 amperes but not less than or greater than or equal to 2 amperes, then the auxiliary outlets 111, 112 and USB ports 232, 234 are disabled or turned off so that no power may be supplied from them as indicated in step 256. The refrigerator outlet 15 remains enabled. If the refrigerator outlet 15 is not drawing less than 14 amperes or drawing greater than or equal to 14 amperes, then the refrigerator outlet 15 is disabled in step 258. This may be accomplished by tripping the relay 20 of the reset circuit off. In addition, the red LED light on the LED indicator and reset button 214 is turned on to identify the disabled condition of the refrigerator. Then, in step 260, the auxiliary outlets 111, 112 and USB ports 232, 234 are enabled so that power may be supplied through them.

Then, the exemplary at least one control circuit determines whether the refrigerator outlet 15 is drawing less than 14 amperes in step 262. If the refrigerator outlet 15 is not drawing less than 14 amperes or drawing greater than or equal to 14 amperes, then the refrigerator outlet 15 remains disabled and the red LED light on the LED indicator and reset button 214 remains turned on to identify the disabled condition of the refrigerator 3. This condition may occur, for example, if an electrical heater is plugged into what is normally used as the refrigerator electrical supply outlet 15. When the refrigerator outlet 15 draws less than 14 amperes resulting from the overload condition being eliminated, the refrigerator outlet 15 will be enabled by the control circuit so that power may supplied to the refrigerator outlet 15 upon the LED indicator and reset button 214 being depressed as indicated in step 264. Depression of the LED indicator and reset button 214 in this condition will also turn off the red LED light. The process then ends. It should be noted that the at least one control circuit 104 can make the determination in steps at the same time or in a different order.

It should be understood that in exemplary arrangements, determination as to the power draw from receptacles that have been disabled, may be determined through a process of again supplying power output through the receptacle. The power draw from the receptacle is monitored continuously after the power is restored and if it is detected that the power draw exceeds a threshold or other determined amount, power is discontinued to the receptacle. In some exemplary arrangements, the power sensing circuitry may operate in conjunction with the controller to calculate the current power draw level. The control circuitry may also operate in accordance with its programming to determine that other connected devices are consuming power which may necessitate not providing power to the receptacle so as to avoid an overload condition. Alternatively or in addition, the control circuitry may be operative to monitor other conditions that may be indicative of a problem when the power is restored to a receptacle, port or other control outlet. For example, responsive to a manual input to reinstitute the supply of power thereto, the control circuitry may operate to recognize conditions that correspond to an electrical short or other malfunction which necessitates an immediate withdrawal of electrical power thereto. This may include, for example, monitoring the rate at which power is drawn and the current flow increases to detect a short or other fault condition. Numerous different types of detection circuitry and control approaches may be implemented in order to help assure that if power output has been discontinued, that excessive power draw or undesirable conditions are not a problem when power is reinstated.

Although exemplary arrangements are described herein as used in conjunction with vapor compression refrigerators, embodiments employing the principles described herein may also be used with other types of refrigerators. Such refrigerators may include refrigerators that use thermoelectric cooling, such as Peltier elements to provide cooling. Other arrangements may include absorption refrigerators to provide cooling. In such arrangements the components of the refrigerator apparatus which draw electrical power, are controlled through operation of at least one power control circuit, to prevent, suspend or defer the operation thereof at times when the microwave radiation emitting cooking element of other components that draw electrical power are to be operated, so as to avoid exceeding a maximum threshold for current draw for the combined appliance that is permitted by the at least one control circuit.

It should be understood that the above description is only illustrative of the exemplary arrangements. Various alternatives and modifications can be devised by those skilled in the art without departing from the teachings of exemplary arrangements. Accordingly, the present application is intended to embrace all such alternatives, modifications and variances which fall with the scope of the appended claims.

Thus the exemplary systems, arrangements, and methods of operation that have been described herein achieve desirable capabilities, eliminate difficulties encountered in the use of prior devices and systems and attain the useful results described herein.

In the foregoing description, certain terms have been used in describing exemplary arrangements for purposes of brevity, clarity and understanding. However, no unnecessary limitations are to be implied therefrom because such terms are used for descriptive purposes and are intended to be broadly construed. Moreover, the descriptions and illustrations herein are by way of examples and the inventive features are not limited to the particular features shown and described.

Further it should be understood that elements, features, relationships, devices and other aspects described in connection with one exemplary arrangement may be utilized in connection with other exemplary arrangements such that numerous different arrangements, functions and capabilities may be carried out. Numerous different aspects of described arrangements may be used together or in different combinations to achieve useful results.

Having described the features, discoveries and principles of the exemplary arrangements, the manner in which they are constructed and operated, and the advantages and useful results attained, the new and useful structures, devices, elements, arrangements, parts, combinations, systems, equipment, operations, methods, processes and relationships are set forth in the appended claims.

We claim:

1. Apparatus comprising:

a microwave oven, wherein the microwave oven includes a magnetron, wherein the magnetron is configured to cook items in a cooking area within the microwave oven, a smoke sensor, wherein the smoke sensor is positioned within the microwave oven and in operative connection with the cooking area, a power cord, wherein the power cord is configured to be releasably connected to a source of electrical power, at least one externally accessible electrical connector, wherein each electrical connector is configured to deliver electrical power that is received through the power cord through the respective electrical connector to a respective electrically powered device that is outside of the microwave oven, at least one circuit, wherein the at least one circuit is in operative electrical connection with each of the power cord, the at least one electrical connector, the magnetron, and the smoke sensor, wherein responsive at least in part to smoke sensed by the smoke sensor, the at least one circuit is operative to cause cooking power to the magnetron to be withdrawn to end a current cooking session, wherein after the current cooking session has been caused to end based on the sensed smoke, the at least one circuit is operative thereafter to automatically enable the magnetron to receive cooking power in a next subsequent cooking session.

2. The apparatus according to claim 1 wherein the at least one circuit is operative to cause electrical power to be unavailable to the at least one electrical connector during at least a portion of the time that the magnetron is operative.

3. The apparatus according to claim 1
wherein the at least one electrical connector comprises an electric outlet configured to releasably receive a plug in electrical connection therewith,
wherein the at least one circuit is operative to cause electrical power to be unavailable to the electric outlet during at least a portion of the time that the magnetron is operative.

4. The apparatus according to claim 1
wherein the at least one electrical connector includes a USB port,
wherein the at least one circuit is operative to cause electrical power to be unavailable to the USB port during at least a portion of the time that the magnetron is operative.

5. The apparatus according to claim 1
wherein the smoke sensor includes at least one or more of
a radiation emitter and radiation receiver,
a photosensor,
a motion sensor,
an ionization sensor, or
a VOC sensor.

6. The apparatus according to claim 1
wherein the at least one electrical connector comprises an electric outlet configured to releasably receive a plug of a refrigerator in electrical connection therewith,
wherein the at least one circuit is operative to cause electrical power to be unavailable to the electric outlet during at least a portion of the time that the magnetron is operative.

7. The apparatus according to claim 1
wherein the power cord comprises a single power cord,
wherein the at least one electrical connector includes
an electric outlet configured to releasably receive a plug of a refrigerator, and
a USB port.

8. The apparatus according to claim 1
wherein the power cord comprises a single power cord,
wherein the at least one electrical connector includes one or more of
an electric outlet, or
a USB port,
wherein the at least one circuit is operative to cause electrical power to be unavailable to one or more of the electric outlet or the USB port during at least a portion of the time that the magnetron is operative.

9. The apparatus according to claim 1
wherein the at least one circuit is operative to cause electrical power to be unavailable to the at least one electrical connector during at least a portion of the time that the magnetron is operative, and for a predetermined time period after electrical power becomes unavailable to the at least one electrical connector.

10. The apparatus according to claim 1
wherein the at least one circuit is operative to cause cooking power to the magnetron to be withdrawn to end the cooking session responsive at least in part to smoke sensed by the smoke sensor being at least at a threshold continuously for a predetermined time.

11. The apparatus according to claim 1
wherein the microwave oven includes a front side and a back side,
wherein the front side includes a control panel, an opening and a movable door, wherein in an open position of the door, the cooking area is accessible from outside the microwave oven,
wherein the power cord comprises a single power cord,
wherein the at least one electrical connector includes
an electric outlet on the back side configured to releasably connect to a plug of a refrigerator.

12. The apparatus according to claim 1
wherein the microwave oven includes a front side and a back side,
wherein the front side includes a control panel, an opening and a movable door, wherein in an open position of the door the cooking area is accessible from outside the microwave oven,
wherein the power cord comprises a single power cord,
wherein the at least one electrical connector includes
an electric outlet on the back side configured to releasably connect to a plug of a refrigerator, and
a USB port on the front side,
wherein the at least one circuit is operative to cause electrical power to be unavailable to one or both of the electric outlet and the USB port during at least a portion of the time that the magnetron is operative.

13. The apparatus according to claim 1
and further comprising:
a refrigerator, wherein the refrigerator is electrically connected to the at least one externally accessible electrical connector,
wherein the at least one circuit is operative to cause electrical power to be unavailable to the refrigerator during at least a portion of the time that the magnetron is operative.

14. The apparatus according to claim 1
wherein the at least one circuit is operative to cause electrical power to be unavailable to the at least one electrical connector at least one of while the magnetron is operative and for at least a preset minimum period after the magnetron becomes operative.

15. The apparatus according to claim 1
wherein the smoke sensor comprises a VOC sensor.

16. The apparatus according to claim 1
wherein the microwave oven includes an air passage that extends between the cooking area and the microwave oven exterior,
wherein the smoke sensor is positioned in the air passage.

17. The apparatus according to claim 1
wherein the at least one circuit is operative to cause electrical power to be withheld from at least one component of a refrigerator for at least a set time period after the magnetron begins to draw cooking power.

18. The apparatus according to claim 1
wherein the at least one circuit is operative to cause cooking power to the magnetron to be withdrawn responsive to the smoke sensed by the smoke sensor reaching an activation point.

19. The apparatus according to claim 1
wherein the at least one circuit is operative to cause cooking power to the magnetron to be withdrawn responsive to the smoke sensed by the smoke sensor being at least at a programmed threshold.

20. The apparatus according to claim 1
wherein the at least one circuit is operative to cause cooking power to the magnetron to be withdrawn responsive to the smoke sensed by the smoke sensor reaching a trip point.

21. The apparatus according to claim 1
wherein the at least one circuit is operative to cause cooking power to the magnetron to be withdrawn responsive to the smoke sensed by the smoke sensor being at a predetermined smoke density.

22. The apparatus according to claim 1 wherein the at least one circuit is operative to cause cooking power to the magnetron to be withdrawn responsive to the smoke sensed by the smoke sensor having changed by a programmed threshold amount.

23. The apparatus according to claim 1 wherein the at least one circuit is operative to cause cooking power to the magnetron to be withdrawn responsive to the smoke sensed by the smoke sensor having changed by a programmed threshold amount since a start of the current cooking session.

24. The apparatus according to claim 1 wherein the at least one circuit is operative to cause cooking power to the magnetron to be withdrawn responsive to smoke sensor detection of a threshold of volatile organic compounds (VOC) concentration.

25. The apparatus according to claim 1 wherein the microwave oven further includes an audible output device, wherein the audible output device is in operative connection with the at least one circuit, wherein the at least one circuit is operative to cause the audible output device to output an audible signal indicative that cooking power to the magnetron has been withdrawn.

26. The apparatus according to claim 1 wherein the microwave oven further includes a visual display, wherein the visual display is in operative connection with the at least one circuit, wherein the at least one circuit is operative to cause the visual display to output at least one visual message indicative that cooking power to the magnetron has been withdrawn due to sensed smoke.

27. Apparatus comprising:

a microwave oven, wherein the microwave oven includes a cooking area within the microwave oven, a magnetron, wherein the magnetron is configured to cook items in the cooking area, at least one smoke sensor, wherein the at least one smoke sensor is positioned within the microwave oven and in operative connection with the cooking area, at least one externally accessible electrical connector, wherein each electrical connector is configured to deliver electrical power from the microwave oven, at least one circuit, wherein the at least one circuit is in operative electrical connection with the magnetron, the at least one smoke sensor, and the at least one electrical connector, wherein responsive at least in part to smoke sensed by the at least one smoke sensor during a cooking session, the at least one circuit is operative to cause power to the magnetron to be withdrawn and the cooking session to end, wherein after the cooking session has been caused to end based on the sensed smoke, the at least one circuit is operative thereafter to automatically enable the magnetron to receive power to commence a next subsequent cooking session.

28. The apparatus according to claim 27 wherein the at least one circuit is operative to cause power to be unavailable from the at least one electrical connector when cooking power is delivered to the magnetron.

29. The apparatus according to claim 27 wherein the at least one electrical connector comprises an electric outlet configured to deliver household current and to releasably receive a plug of a refrigerator in electrical connection therewith.

30. The apparatus according to claim 27 wherein the at least one electrical connector comprises a USB port.

31. The apparatus according to claim 27 wherein the at least one electrical connector comprises an electric outlet configured to deliver household current to a refrigerator, and a USB port, wherein the at least one circuit is operative to cause electrical power to not be deliverable from one or both of the electric outlet and the USB port when cooking power is delivered to the magnetron.

32. The apparatus according to claim 27 and further comprising:

at least one of a refrigerator, and a safe, wherein the at least one of the refrigerator and the safe is in operative electrical connection with the at least one circuit.

33. The apparatus according to claim 27 wherein the electrical connector includes an electric outlet configured to receive a plug that is in electrical connection with a refrigerator, wherein the at least one circuit is operative to cause electrical power to be unavailable from the electric outlet during at least one of while cooking power is delivered to the magnetron and for a period of time after cooking power is in initially delivered to the magnetron.

34. The apparatus according to claim 27 wherein the smoke sensor comprises a VOC sensor.

35. The apparatus according to claim 27 wherein the microwave oven includes an air passage that extends between the cooking area and the microwave oven exterior, wherein the smoke sensor is positioned in the air passage.

36. The apparatus according to claim 27 wherein the at least one circuit is operative to cause electrical power to be unavailable to at least one electrically powered refrigerator component for at least a set time period after the magnetron begins to draw cooking power.

37. Apparatus comprising:

a microwave oven, wherein the microwave oven includes a cooking area within the microwave oven, a magnetron, wherein the magnetron is configured to cook items positioned in the cooking area, at least one smoke sensor, wherein the at least one smoke sensor is positioned within the microwave oven and in operative connection with the cooking area, at least one circuit, wherein the at least one circuit is in operative connection with each of the magnetron and the at least one smoke sensor, wherein the at least one circuit is operative to cause responsive at least in part to smoke sensed by the at least one smoke sensor, cooking power being currently delivered to the magnetron to be withdrawn whereby a current cooking session is ended, and after the current cooking session has been caused to end based on the sensed smoke, cooking power to automatically be enabled to be delivered to the magnetron to commence a next subsequent cooking session.

38. The apparatus according to claim 37 wherein the microwave oven further comprises at least one externally accessible electrical connector, wherein each electrical connector is configured to deliver electrical power from the microwave oven through the respective electrical connector, wherein the at least one electrical connector is in operative connection with the at least one circuit, wherein the at least one circuit is operative to cause electrical power to be unavailable from the at least one electrical connector when cooking power is caused to be delivered to the magnetron.

39. The apparatus according to claim 38 wherein the at least one circuit is operative to cause electrical power to be withheld from the at least one electrical connector for at least a set time period after the magnetron begins to draw cooking power.

40. The apparatus according to claim 37 wherein the microwave oven further includes at least one externally accessible electrical outlet configured to be connected to a plug of a refrigerator, wherein the at least one electrical outlet is in operative connection with the at least one circuit, wherein the at least one circuit is operative to cause electrical power to be unavailable from the at least one electrical outlet when cooking power is delivered to the magnetron and for a period of time after cooking power is no longer delivered to the magnetron.

41. The apparatus according to claim 37 wherein the smoke sensor comprises a VOC sensor.

42. The apparatus according to claim 37 wherein the microwave oven includes an air passage that extends between the cooking area and the microwave oven exterior, wherein the smoke sensor is positioned in the air passage.

43. The apparatus according to claim 37 wherein the microwave oven further includes a temperature sensor, wherein the temperature sensor is in operative connection with the at least one circuit, wherein the at least one circuit is operative to cause cooking power to the magnetron to be withdrawn to end the current cooking session responsive at least in part to the temperature sensor.

* * * * *